(12) United States Patent
Sekiguchi et al.

(10) Patent No.: US 11,842,556 B2
(45) Date of Patent: *Dec. 12, 2023

(54) IMAGE ANALYSIS METHOD, APPARATUS, PROGRAM, AND LEARNED DEEP LEARNING ALGORITHM

(71) Applicant: SYSMEX CORPORATION, Kobe (JP)

(72) Inventors: Yosuke Sekiguchi, Kobe (JP); Kazumi Hakamada, Kobe (JP); Yuki Aihara, Kobe (JP); Kohei Yamada, Kobe (JP); Kanako Masumoto, Kobe (JP); Krupali Jain, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,488

(22) Filed: Jun. 21, 2021

(65) Prior Publication Data

US 2021/0312627 A1  Oct. 7, 2021

Related U.S. Application Data

(63) Continuation of application No. 16/193,422, filed on Nov. 16, 2018, now Pat. No. 11,074,692.

(30) Foreign Application Priority Data

Nov. 17, 2017 (JP) .................................. 2017-222178

(51) Int. Cl.
*G06V 20/69* (2022.01)
*G06V 10/44* (2022.01)
(Continued)

(52) U.S. Cl.
CPC .......... *G06V 20/698* (2022.01); *G06T 7/0014* (2013.01); *G06T 7/74* (2017.01);
(Continued)

(58) Field of Classification Search
None
See application file for complete search history.

(56) References Cited

U.S. PATENT DOCUMENTS 11,487,995 B2 * 11/2022 Du ........................ G06V 10/764
2006/0275847 A1   12/2006 Goodyer et al.
(Continued)

FOREIGN PATENT DOCUMENTS

| CN | 103020585 A | 4/2013 |
| CN | 106570505 A | 4/2017 |

(Continued)

OTHER PUBLICATIONS

Notice of Reasons for Refusal dated Sep. 14, 2021, by the Japanese Patent Office in corresponding Japanese Patent Application No. 2017-222178 and an English translation of the Notice. (6 pages).

(Continued)

*Primary Examiner* — Nancy Bitar
(74) *Attorney, Agent, or Firm* — BUCHANAN INGERSOLL & ROONEY PC

(57) ABSTRACT

The present invention provides an image analysis method for generating data indicating a region of a cell nucleus in an image of a tissue or a cell. The image analysis method is a method for analyzing an image of a tissue or a cell using a deep learning algorithm of a neural network structure, and generates data indicating a region of a cell nucleus in an analysis target image by the deep learning algorithm by generating analysis data from the analysis target image including an analysis target tissue or cell, and inputting the analysis data in the deep learning algorithm.

14 Claims, 20 Drawing Sheets

(51) Int. Cl.
  *G06V 10/56*  (2022.01)
  *G06T 7/73*  (2017.01)
  *G06T 7/90*  (2017.01)
  *G06T 7/00*  (2017.01)

(52) U.S. Cl.
  CPC .............. *G06T 7/90* (2017.01); *G06V 10/44* (2022.01); *G06V 10/56* (2022.01); *G06T 2207/20084* (2013.01); *G06T 2207/30024* (2013.01)

(56) References Cited

U.S. PATENT DOCUMENTS

| | | | |
|---|---|---|---|
| 2008/0144915 | A1 | 6/2008 | Wong et al. |
| 2012/0128220 | A1 | 5/2012 | Nagase et al. |
| 2017/0053398 | A1 | 2/2017 | Mahoor et al. |
| 2017/0169567 | A1 | 6/2017 | Chefd'hotel et al. |
| 2018/0232883 | A1* | 8/2018 | Sethi .................. G16H 30/40 |
| 2019/0139642 | A1 | 5/2019 | Roberge et al. |
| 2019/0156476 | A1* | 5/2019 | Yoshida ............. G06T 7/0012 |
| 2019/0156481 | A1* | 5/2019 | Sekiguchi ........... G06T 7/0014 |
| 2019/0205606 | A1 | 7/2019 | Zhou et al. |
| 2019/0287274 | A1* | 9/2019 | Ariga ................. G06T 11/005 |
| 2020/0097701 | A1 | 3/2020 | Chukka et al. |
| 2020/0129263 | A1 | 4/2020 | Izadyyazdanabadi et al. |

FOREIGN PATENT DOCUMENTS

| | | |
|---|---|---|
| CN | 107256558 A | 10/2017 |
| JP | 2005-525551 A | 8/2005 |
| JP | 2010203949 A | 9/2010 |
| JP | 2011-030844 A | 2/2011 |
| JP | 2012-255810 A | 12/2012 |
| JP | 2014-142348 A | 8/2014 |

OTHER PUBLICATIONS

Office Action (Decision of Refusal) dated Jun. 7, 2022, by the Japanese Patent Office in corresponding Japanese Patent Application No. 2017-222178 and an English translation of the Office Action. (5 pages).

NEC Medical Solution Division Global Solution Group, "Pathology Image Analysis System", Empowered by Innovation NEC, Apr. 2015, and an English translation thereof. (4 pages).

Sirinukunwattana et al., "Locality Sensitive Deep Learning for Detection and Classification of Nuclei in Routine Colon Cancer Histology Images", Accepted for Publication in IEEE Transactions on Medical Imaging, Feb. 2016, pp. 1-12.

Xing et al., "An Automatic Learning-Based Framework for Robust Nucleus Segmentation", IEEE Transactions on Medical Imaging, Feb. 1, 2016, vol. 35, No. 2, pp. 550-566.

Xu et al., "Stacked Sparse Autoencoder (SSAE) for Nuclei Detection on Breast Cancer Histopathology Images", IEEE Transactions on Medical Imaging, Jul. 17, 2015, vol. 35, No. 1, pp. 119-130.

Extended European Search Report dated Mar. 19, 2019, by the European Patent Office in counterpart European Patent Application No. 18206451.9 (9 pages).

Communication pursuant to Article 94(3) EPC dated Dec. 19, 2019, by the European Patent Office in corresponding European Patent Application No. 18 206 451.9 (8 pages).

Office Action dated Mar. 25, 2023, by the State Intellectual Property Office of the People's Republic of China in counterpart Chinese Patent Application No. 201811362790.2, and an English translation of the Office Action (19 pages).

Office Action dated Jul. 18, 2023, by the Japanese Patent Office in counterpart Japanese Patent Application No. 2022-141451, with an English translation of the Office Action (6 pages).

Office Action dated Sep. 22, 2023, by the Chinese People's Republic National Intellectual Property Office in counterpart Chinese Patent Application No. 201811362790.2, with English translation of the Office Action (8 pages).

* cited by examiner

IMAGE ANALYSIS METHOD, APPARATUS, PROGRAM, AND LEARNED DEEP LEARNING ALGORITHM

CROSS REFERENCE TO RELATED APPLICATIONS

This application is a continuation of U.S. patent application Ser. No. 16/193,422, filed on Nov. 16, 2018, now U.S. Pat. No. 11,074,692, entitled "IMAGE ANALYSIS METHOD, APPARATUS, PROGRAM, AND LEARNED DEEP LEARNING ALGORITHM," which in turn claims priority from Japanese Patent Application Publication No. 2017-222178, filed on Nov. 17, 2017, entitled "IMAGE ANALYSIS METHOD, APPARATUS, PROGRAM, AND LEARNED DEEP LEARNING ALGORITHM", the entire contents of each of which are incorporated herein by reference.

FIELD OF THE INVENTION

The present invention relates to an image analysis method, apparatus, program, and learned deep learning algorithm. More specifically, the invention relates to an image analysis method including the generation of data indicating the region of a cell nucleus at an optional position of the image of the tissue or cell.

BACKGROUND

Japanese Patent Application Publication No. 2010-203949 discloses an image diagnosis support apparatus that determines and classifies a tissue image in a pathological tissue image into four groups of normal, benign tumor, precancerous state, and cancer state. The image classifying means extracts the focus region from the image data, calculates a feature amount indicative of the feature of the focus region, and classifies the group based on the calculated feature amount. Feature amounts are the density of clusters per unit area in the cell nucleus, the density of cluster areas, the area of clusters, the thickness of clusters, and the length of clusters. The image determining means learns the relationship between the feature amount and the determination result and makes a determination based on the learned learning parameter. Learning executes machine learning using learning algorithms such as support vector machines.

SUMMARY OF THE INVENTION

When definitively diagnosing whether a tumor is a malignant tumor, histopathological diagnosis using a histopathological sample is performed. Histopathological diagnosis is often performed as an intraoperative rapid diagnosis to determine the site of excision of tissue containing malignant tumor during surgery. Intraoperative rapid diagnosis is performed while the affected area of the patient is incised and the surgical operation is temporarily halted awaiting a determination of histopathological tissue diagnosis such as whether the tumor is malignant, whether there is tumor remains in the resection margin of the excised tissue, whether there is lymph node metastasis and the like. The result of intraoperative rapid diagnosis determines the subsequent direction of temporarily halted surgery of the patient.

Although the histopathological diagnosis is performed by a physician, particularly a pathologist, by observing the tissue sample with a microscope or the like to diagnose the tissue sample, in order to be able to perform accurate definitive diagnosis by observing the tissue sample, the pathologist must repeatedly observe tissue samples of various cases under supervision of a highly skilled pathologist, such that the training of a pathologist takes an extraordinary amount of time.

There is a serious pathologist shortage, and as a result of this pathologist shortage, there is a delay in the confirmation of the diagnosis of a patient's malignant tumor, a delay in the start of treatment, or the situation in which treatment is started without waiting for the definitive diagnosis. Since both normal tissue diagnosis and rapid intraoperative diagnosis both rely on insufficiently few pathologists, the workload of the individual pathologist becomes enormous and the labor conditions of the pathologist himself also becomes a problem. However, at present, no solution to this problem has been found.

Therefore, it is considered that enabling a device to support pathological tissue diagnosis will greatly contribute to the elimination of the shortage of pathologists and the improvement of the labor conditions of pathologists, especially as the diagnosis is closer to determination by the human eye.

In view of the fact that the apparatus supports pathological tissue diagnosis in the invention described in the above-mentioned Japanese Patent Application Publication No. 2010-203949, the pathology of the sample tissue is determined based on image analysis by machine learning. In this method, it is necessary to create a feature amount by human hand. There is a problem that the ability of the person to greatly influence the performance of the image analysis in the method of creating the feature amount by human hand.

For example, in tissue diagnosis or cell diagnosis using a microscope, one observation target is the state of the cell nucleus, and malignant tumors and benign tumors are differentiated from the size and form of each cell nucleus, the arrangement state of a plurality of cell nuclei and the like. Therefore, it is very important that the cell nucleus can be accurately extracted in pathological tissue diagnosis as the basis of histological diagnosis and cell diagnosis.

The present invention provides an image analysis method for generating data indicating the cell nucleus region in images of tissue or cells.

One aspect of the present invention is an image analysis method. In this aspect, the image analysis method for analyzing an image of a tissue or a cell using a deep learning algorithm (60) of a neural network structure includes generating analysis data (80) from the analysis target image (78) including the tissue or cell to be analyzed (S21 to S23), inputting the analysis data (80) in the deep learning algorithm (60) (S24), and generating data (82, 83) indicating the tumorigenic state of tissue or cells in the analysis target image (78) by the deep learning algorithm (60) (S25 to S28). In this way it is possible to generate of data indicating the region of a cell nucleus at an optional position of the image of a tissue or a cell.

It is preferable that the image to be analyzed is an image of a tissue diagnostic specimen and the analysis target image (78) contains a hue consisting of one primary color or contains hues (R, G, B) combining two or more primary colors.

It is preferable that the image to be analyzed is an image of a cell diagnostic specimen and the analysis target image (78) contains a hue consisting of one primary color or contains hues (R, G, B) combining two or more primary colors.

It is preferable that the data (82, 83) indicating the tumorigenic state are data for distinguishing and presenting the nuclear region of a cell and other regions.

It is preferable that the data (82, 83) indicating the tumorigenic state are data for indicating boundary of the cell nucleus region and other regions.

The deep learning algorithm (60) preferably determines whether an arbitrary position in the analysis target image (78) is a cell nucleus region.

It is preferable to generate a plurality of analysis data (80) for each region of a predetermined number of pixels for one analysis target image (78). In this way it possible to improve the discrimination accuracy of the neural network (60).

The analysis data (80) preferably are generated for each region of a predetermined number of pixels including peripheral pixels circumscribing a predetermined pixel, and the deep learning algorithm (60) preferably generates a label indicating whether a region is a cell nucleus in the predetermined pixel from the input analysis data (80). In this way it possible to improve the discrimination accuracy of the neural network (60).

It is preferable that the number of nodes of the input layer (60a) of the neural network (60) corresponds to the product of the number of combined primary colors with the predetermined number of pixels of the analysis data (80). In this way it possible to improve the discrimination accuracy of the neural network (60).

It is preferable that the sample is a stained sample, and the analysis target image (78) is an image obtained by imaging the stained sample under a bright field microscope.

The training data (74) used for learning of the deep learning algorithm (60) include a stained image (70) of a sample prepared by applying a bright field observation stain to a sample of a tissue collected from an individual or a sample containing cells collected from the individual captured in the bright field of the microscope and a fluorescence image of cell nuclei (71) prepared by fluorescence staining of cell nuclei in the same sample or a corresponding sample under fluorescence observation via a fluorescence microscope, the training data (74) preferably being generated based on the position in the sample of the fluorescence image (71) corresponding to the position in the obtained bright field image (70).

The stain used for bright field observation is preferably hematoxylin nucleus stain.

When the sample is a tissue sample, the bright field observation stain is preferably hematoxylin-eosin stain, and when the sample is a sample containing cells, the bright field observation stain is preferably a Papanicolaou stain.

The training data (74) preferably includes a label value indicating a region of the cell nucleus extracted from the bright field image (70) and the fluorescence image (71). In this way it becomes possible for the neural network (50) to learn the label value indicating the region of the cell nucleus.

The training data (74) preferably includes a label value for each pixel of the bright field image (70). In this way it becomes possible for the neural network (50) to learn the label value indicating the region of the cell nucleus.

The training data (74) are preferably generated for each area of a predetermined number of pixels in the bright field image (70). In this way it becomes possible to cause the neural network (50) to learn the label value indicating the region of the cell nucleus with high accuracy.

The deep learning algorithm (60) preferably classifies the analysis data (80) into classes indicating regions of cell nuclei contained in the analysis target image (78). In this way it is possible to classify arbitrary positions of an analysis target tissue image and an image including a cells into a region of a cell nucleus and another region.

It is preferable that the output layer (60b) of the neural network (60) is a node having a soft max function as an activation function. In this way it is possible for the neural network (60) to classify arbitrary positions of an analysis target tissue image and an image including a cell into a finite number of classes.

Each time the analysis data (80) are input, the deep learning algorithm (60) generates data (82) indicating whether the region is a cell nucleus region included in the analysis target image (78) for each unit pixel. In this way it is possible to classify into a cell nucleus region and other regions for each unit pixel (one pixel) of an analysis target tissue image or an image including a cell.

It is preferable that the deep learning algorithm (60) is generated according to the type of tissue sample or the type of sample containing cells. In this way it is possible to selectively use the deep learning algorithm (60) according to the type of the analysis target tissue image or the image including cells, and it is possible to improve the discrimination accuracy of the neural network (60).

The analysis data (80) preferably are processed using a deep learning algorithm (60) corresponding to the type of sample selected from a plurality of deep learning algorithms (60) according to the type of the tissue sample or the type of the sample including the cells. In this way it is possible to selectively use the deep learning algorithm (60) according to the type of the analysis target tissue image or the image including cells, and it is possible to improve the discrimination accuracy of the neural network (60).

One aspect of the present invention is an image analysis apparatus. In this aspect, the image analyzing apparatus (200A) is an image analyzing apparatus for analyzing an image of a tissue or a cell using a deep learning algorithm (60) of a neural network structure, and includes a processing unit (20A) for generating data (82, 83) indicating a region of the cell nucleus in the analysis target image (78) via the deep learning algorithm (60) by generating analysis data (80) from an analysis target image (78) including an analysis target tissue or cell, and inputting the analysis data (80) in the deep learning algorithm (60). In this way it is possible to generate data indicating whether an arbitrary position of a tissue image or an image including a cell is a region of a cell nucleus.

One aspect of the invention is a computer program. In this aspect, the computer program is a computer program for analyzing an image of a tissue or a cell using a deep learning algorithm (60) of a neural network structure, the computer program causing a computer to execute a process to generate analysis data (80) from an analysis target image (78) including analysis target tissue or cells, a process to input the analysis data (80) in the deep learning algorithm (60), and a process to generate data (82, 83) indicating the region of a cell nucleus in the analysis target image (78) by the deep learning algorithm (60). In this way it is possible to generate of data indicating the region of a cell nucleus at an optional position of the image of a tissue or a cell.

One aspect of the present invention is a method of manufacturing a learned deep learning algorithm. In this aspect, the method of manufacturing the learned deep layer learning algorithm (60) includes a first acquisition step of acquiring the first training data (72r, 72g, 72b) corresponding to the first training image (70) of imaged tissue or cells, a second acquisition step of acquiring second training data (73) corresponding to a second training image (71) indicating a region of the cell nucleus in the first training image (70), and a learning step (S13 to S19) for causing the neural network (50) to learn the relationship between the first training data (72r, 72g, 72b) and the second training data (73). In this way it is possible to produce a deep learning algorithm for generating data indicative of regions of the cell nucleus for arbitrary positions of images of tissues or cells.

The first training data (72r, 72g, 72b) preferably is the input layer (50a) of the neural network (50) and the second training data (73) preferably is the output layer (50b) of the neural network.

It is preferable that a step (S11) to generate the first training data (72r, 72g. 72b) from the first training image (70) is included before the first acquisition step, and a step (S12) to generate the second training data (73) from the second training image (71) is included before the second acquisition step. In this way it is possible to produce a deep learning algorithm for generating data indicative of regions of the cell nucleus for arbitrary positions of images of tissues or cells.

The first training image (70) is a bright field image captured under a bright field microscope of a stained image of a sample prepared by applying a bright field observation stain to a tissue sample taken from an individual or a sample containing cells collected from the individual, and the second training image (71) is a fluorescence image of a sample prepared by applying fluorescent nucleus stain to the sample under fluorescence observation under a microscope, wherein the position in the sample of the fluorescence image (71) corresponds to the position in the sample of the acquired bright field image (70).

One aspect of the present invention is a learned deep learning algorithm (60). In this aspect, the learned deep learning algorithm (60) is a deep learning algorithm that learns the first training data (72r, 72g, 72b) as the input layer (50a) of the neural network (50), and learns the second training data as the output layer (50b) of a neural network (50), wherein the first training data (72r, 72g, 72b) are generated from the first training image (70) of imaged tissue or cells, and the second training data (73) indicates the region of the cell nucleus in the first training image.

According to the present invention, data indicating the region of the cell nucleus can be generated for any position in the image of the tissue or cell.

DESCRIPTION OF THE EMBODIMENTS OF THE INVENTION

Figure 1:
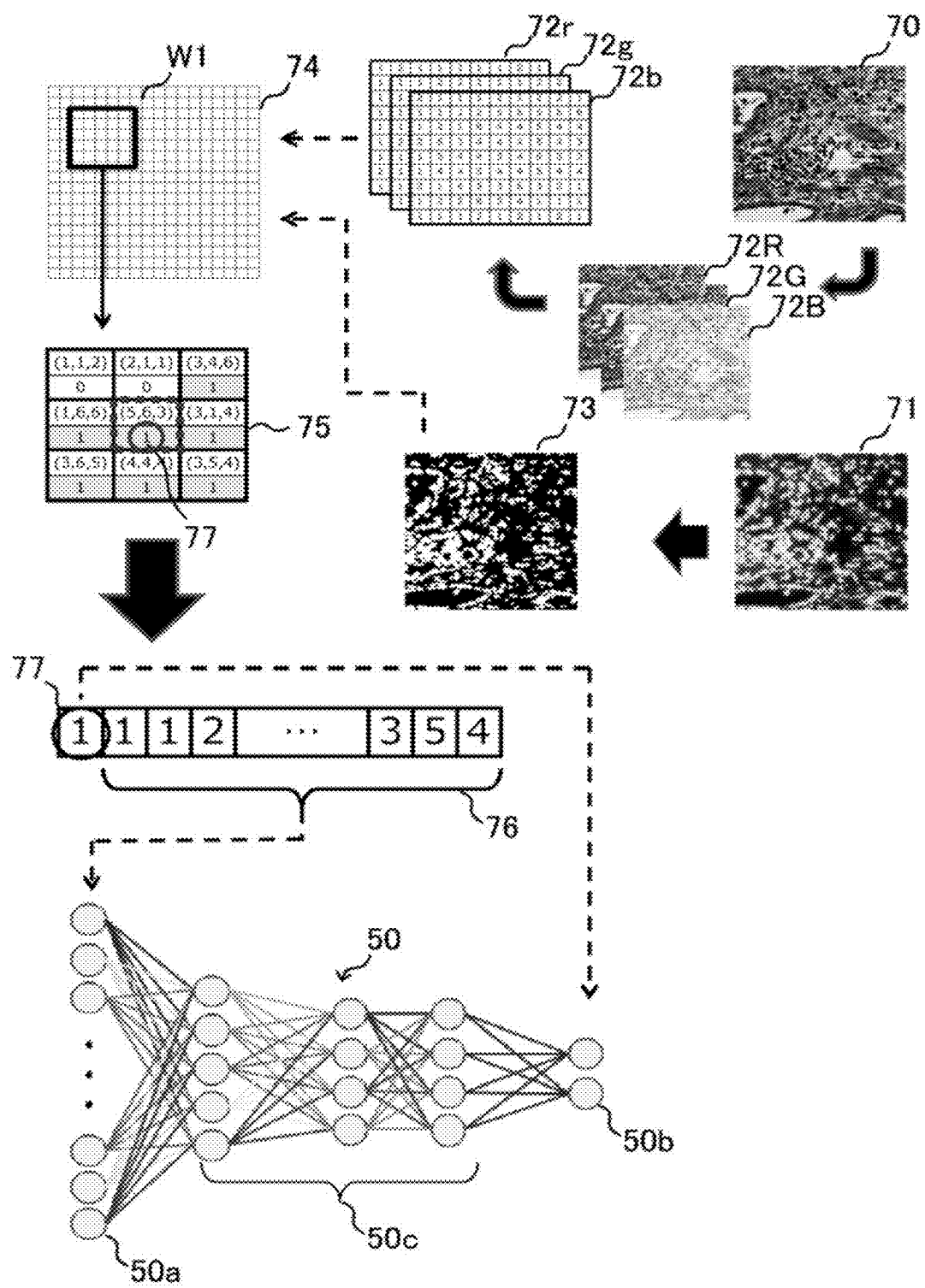
FIG. 1 is a schematic diagram illustrating a summary of a deep learning method.

Hereinafter, a summary and embodiments of the present invention will be described in detail with reference to the accompanying drawings. Note that in the following description and drawings the same reference numerals denote the same or similar constituent elements, and therefore, descriptions of the same or similar constituent elements are omitted.

The present invention relates to an image analysis method for analyzing an image of a tissue or a cell, and an image analysis method using a deep learning algorithm of a neural network structure.

In the present invention, an image of a tissue or a cell is an image obtained from a tissue sample or a sample containing a cell. Samples of tissue samples or samples containing cells are taken from individuals. The individual is not particularly limited, but is preferably a mammal, more preferably a human. Whether an individual is alive or deceased when a sample is taken from the individual is irrelevant. The tissue is not limited as long as it is present in the individual. Examples of tissues collected from an individual include surgically excised tissue, biopsy tissue and the like. Samples containing cells are not limited insofar as they are taken from individuals. For example, sputum, pleural effusion, ascites, urine, cerebrospinal fluid, bone marrow, blood, cystic fluid and the like can be mentioned.

The sample is intended as a preparation to prepare a sample including the tissue sample or sample including cells to be process for observation by microscope and the like. The sample can be prepared according to a known method. For example, in the case of a tissue sample, after tissue is collected from an individual, the tissue is fixed with a prescribed fixing solution (formalin fixative or the like), the fixed tissue is embedded in paraffin, and the paraffin-embedded tissue is sliced. The sliced section is placed on a slide glass. The sample is completed by subjecting the slide glass with slice to staining for observation with an optical microscope, that is, for bright field observation, and performing prescribed sealing treatment. A typical example of a tissue sample is a tissue diagnostic sample (pathological specimen), and the staining is hematoxylin-eosin (HE) staining.

For example, in the case of a sample containing cells, the cells in the sample are attached to a slide glass by centrifugation, smearing or the like, fixed with a predetermined fixing solution (ethanol or the like), stained for bright field observation, and a predetermined sealing process is carried out to complete the sample. A typical example of a sample containing cells is a sample for cytological diagnosis (cytological specimen), and staining is Papanicolaou staining. The cell diagnostic sample also includes an imprinted sample of the tissue collected for the tissue sample.

Both HE staining and Papanicolaou staining are nuclear staining with hematoxylin. Hematoxylin is widely used as a nuclear stain in tissue cell staining (for example, immunostaining, lectin staining, sugar staining, fat staining, collagen fiber staining and the like). Therefore, the invention can be applied to all samples using hematoxylin for nuclear staining.

In the present invention, two types of training images are used during deep learning. One of the images for training (first training image) is an image including tissues or cells contained in a sample of a tissue specimen taken from an individual or a sample of a specimen containing cells taken from an individual. This image is obtained from samples stained so that the tissue structure or cell structure can be recognized by microscopic observation. Although the stain is not limited insofar as the tissue structure or the cell structure can be recognized, a stain for bright field observation is preferable. The above-described bright field observation staining is not limited insofar as at least the cell nucleus and a part other than the cell nucleus can be stained so as to be distinguishable by hue. When the sample is a mammalian tissue sample, for example, HE staining can be mentioned. For example, when the sample is a sample containing mammalian cells, Papanicolaou stain can be mentioned.

The next training image (the second training image) indicates which part of the first training image is the cell nucleus region, that is, the image indicates a region in the first training image that correctly identifies the "cell nucleus region". This image is obtained by selectively irradiating a cell nucleus of a sample that is the same sample from which the first training image was acquired or a sample corresponding to the sample from which the first training image was acquired (for example, a consecutively sliced sample), and the image is captured after performing fluorescent nuclear staining. The fluorescent nucleus stains includes, but is not limited to, 4', 6-diamidino-2-phenylindole (DAPI) stain.

Figure 3:
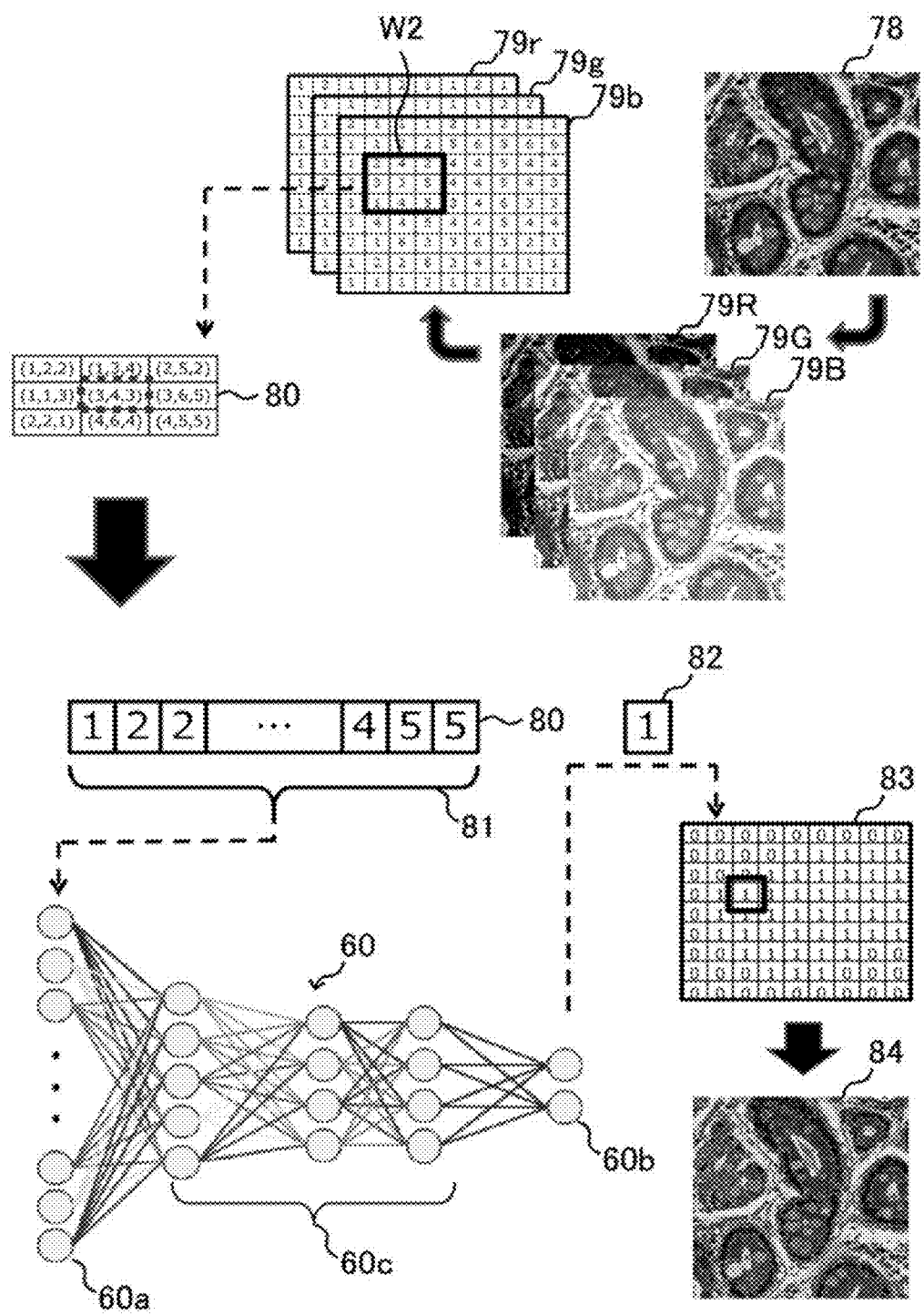
FIG. 3 is a schematic diagram illustrating a summary of an image analysis method.

In the example shown in FIG. 1, the first training image 70 of the tissue subjected to HE staining is DAPI-stained tissue and is used as the first training image, and a second training image 71 from a position in the sample corresponding to the position in the sample shown in the first training image is used as the second training image. An analysis target image 78 of a tissue which has been subjected to the same bright field staining as the first training image shown in FIG. 3 is used as analysis data of the analysis target to be used during the image analysis process. The determination target to be learned as the correct interpretation in the neural network 50 is the region of the cell nucleus contained in the tissue sample or the sample containing cells.

A case in which the region of the cell nucleus contained in an image of the HE stained tissue sample is determined by a deep learning algorithm is described as an example in the summary and the embodiment of the invention.

Summary of Deep Learning Method and Image Analysis Method First, a summary of the deep learning method and image analysis method will be described below. Next, each of the plurality of embodiments of the present invention will be described in detail.

Summary of Deep Learning Method

As shown in FIG. 1, training data generated from each of the above-described first training image and second training image are used in the deep learning method. Since the first training image is imaged as a color image, for example, under observation of the bright field microscope, the HE-stained sample includes a plurality of hues in the first training image.

The first training image (bright field image) 70 can be acquired in advance using an image acquiring device such as a known optical microscope, fluorescent microscope, or virtual slide scanner, for example. Illustratively, in this embodiment it is preferable that color imaging acquired from the image acquiring device is 24-bit color space with RGB. For the 24-bit color of RGB, it is preferable to express the respective densities (color densities) of red, green and blue with 8 bits (256 levels). The first training image (bright field image) 70 may be an image including one or more primary colors.

In the present invention, the hue is illustratively defined by a combination of the three primary colors of light or a combination of the three primary colors of the color. The first training data are generated from the first training image 70 by separating the hues appearing in the first training image 70 into individual primary colors, generating data for each primary color, such that the first training data are data represented by a code corresponding to the density. In FIG. 1, single color images 72R, 72G, and 72B separated for each primary color of red (R), green (G), and blue (B) which are the three primary colors of light.

When the color density of each color is encoded for each pixel on the single color images 72R, 72G, and 72B, the entire image is encoded for each image of R, G, and B by the encoding diagrams 72r, 72g, and 72b. The color density also may be encoded with numerical values indicating 256 gradations of each color. The color density also may be pre-processed for numerical values indicating 256 gradations of each color, and the color density of each pixel may be encoded with numbers indicated by eight levels from 0 to 7, for example. The color density encoding diagrams 72r, 72g, and 72b in the single color image of each color of R, G, and B shown in the example of FIG. 1 represent the color density in each pixel at eight gradations of values from 0 to 7 (three tones expressing tone). Symbols indicating color densities are also referred to as color density values in this specification.

The second training image 71 is an image obtained by capturing fluorescent nuclei-stained samples by fluorescence observation under a fluorescence microscope and capturing images of gray scales of two or more gradations or color images. The second training image 71 may be acquired in advance, for example, using a known bright field image acquisition device such as a fluorescence microscope or a virtual slide scanner.

The second training data are a true value image 73 showing the region of the cell nucleus of the learning target tissue, which is generated from the second training image 71 obtained by imaging the learning target tissue. The first training image 70 and the second training image 71 are images obtained by imaging the same region or corresponding region of the tissue on the sample.

In the second training data, the second training image 71 of color or grayscale having two or more gradations is converted into data as a monochrome fluorescence image by a binarization process, and then learned as the correct interpretation by the neural network 50 and resulting in a true image 73. When the target discriminated by the neural network 60 is a region of a cell nucleus, the true image 73 are data indicating a region of the cell nucleus, that is, a correct interpretation. The region of the cell nucleus and the other regions are distinguished, and the region of the cell nucleus is discriminated by binarizing the second training image 71. Whether the region is a cell nucleus region or a region other than the cell nucleus is determined, for example, by comparing the color density of each pixel in the image with a predetermined condition (for example, a color density threshold value).

In the deep learning method, the color density encoded diagrams 72r, 72g, and 72b (also referred to as first training data) and the true image 73 (also referred to as second training data) are used as the training data 74, the neural network 50 learns the training data 74 with the color density encoded diagrams 72r, 72g, and 72b as the input layer 50a and the true image 73 as the output layer 50b. That is, a pair of the color density encoded diagrams 72r, 72g, and 72b for each color of R, G, and B and the true value image 73 are used as the training data 74 for learning of the neural network 50.

Figures 2A, 2B, 2C:
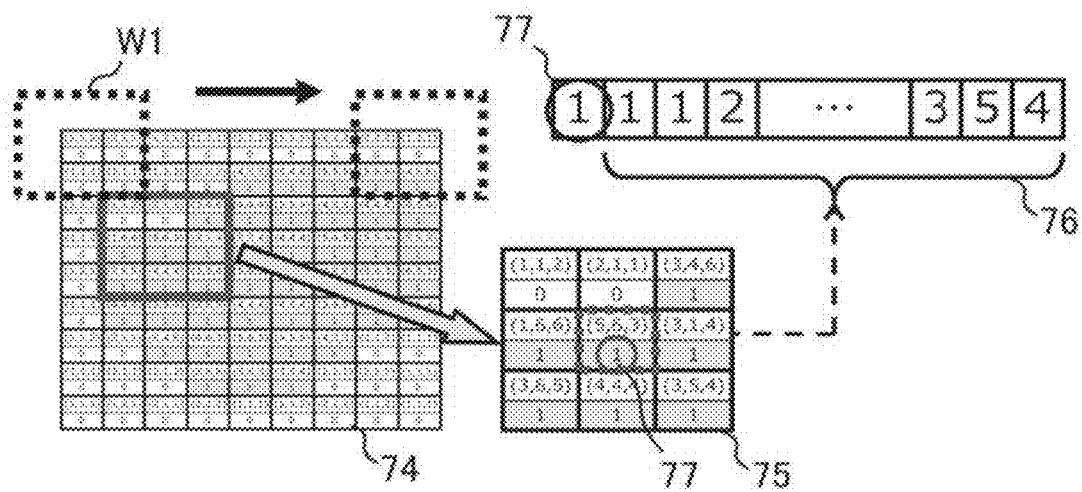
FIGS. 2A-2C show a schematic diagram illustrating the details of training data.

A method of generating the training data 74 will be described with reference to FIGS. 2A to 2C. The training data 74 are data obtained by combining the color density encoded diagrams 72r, 72g, and 72b of each color of R, G, B and the true value image 73. In FIG. 2A, the image size (the size per training datum) of the training data 74 has been simplified for convenience of explanation, and the color density encoded diagrams 72r, 72g, 72b and the true value image 73 have a total of 81 pixels including 9 pixels in the vertical direction and 9 pixels in the horizontal direction.

FIG. 2B shows an example of pixels configuring the training data 74. Three values 74a shown in the upper part of FIG. 2B are density values of R, G, B in each pixel. Illustratively, the three values are stored in the order red (R), green (G) and blue (B). Each pixel of the color density encoded diagrams 72r, 72g, and 72b is shown in eight levels of color density values from value 0 to value 7. This is a process of converting the brightness of each color image 72R, 72G, 72B represented in 256 steps to the eight-step color density value, respectively, as an example of image preprocessing. For the color density value, for example, the lowest brightness (a gradation group having a low brightness value when represented by 256 RGB colors) is set as the color density value 0, and gradually higher values are assigned as the degree of brightness increases, with the highest brightness (gradation group having high brightness value when expressed in RGB color of 256 gradations) is set as color density value 7. The value 74b shown in the lower part of FIG. 2B is binary data of the true image 73. The binary data 74b of the true image 73 is also called a label value. For example, the label value 1 indicates the region of the cell nucleus, and the label value 0 indicates the other region. That is, in the true value image 73 shown in FIG. 1, the position of the label value changing from 1 to 0 or the position of the pixel changing from 0 to 1 corresponds to the boundary between the region of the cell nucleus and the other region.

The training data 75 shown in FIG. 2C are data obtained by extracting an area of a predetermined number of pixels (hereinafter referred to as "window size") of the training data 74 shown in FIG. 2A. Although the window size of the tumor site training data 75 is simplified to 3×3 pixels for the sake of convenience of explanation, the actual preferable window size is illustratively about 113×113 pixels, and among them, a size of a 3×3 nuclei of normal gastric epithelial cells is preferable from the viewpoint of learning efficiency. For example, as shown in FIG. 2C, a window W1 of 3×3 pixels is set and the window W1 is moved relative to the training data 74. The center of the window W1 is located at any pixel of the training data 74, for example, the training data 74 in the window W1 indicated by the black frame are extracted as the training data 75 of the window size. The extracted window size training data 75 are used for learning of the neural network 50 shown in FIG. 1.

As shown in FIG. 1, the number of nodes of the input layer 50a of the neural network 50 is the number of pixels of the training data 75 of the input window size and the number of the primary colors included in the image (for example, three nodes: R, G, and B in the case of the three primary colors of light). The color density value data 76 of each pixel of the window size training data 75 are set as the input layer 50a of the neural network, and the binarized data 77 of the pixel located at the center among the binary data 74b corresponding to the true value image 73 of each pixel of the training data 75 is set as the output layer 50b of the neural network 50 and are learned by the neural network 50. The color density value data 76 of each pixel are aggregate data of the color density values 74a of each color of R, G, B of each pixel of the training data 75. As an example, when the training data 75 has a window size of 3×3 pixels, one color density value 74a is given for each R, G, and B for each pixel, such that the number of color density values of the color density value data 76 is "27" (3×3×3=27) and the number of nodes of the input layer 50a of the neural network 50 also becomes "27".

In this way the training data 75 of the window size input to the neural network 50 can be automatically created by the computer without being created by the user. Efficient deep layer learning of the neural network 50 is promoted in this way.

As shown in FIG. 2C, in the initial state the center of the window W1 is located at the upper left corner of the training data 74. Thereafter, the training data 75 of the window size is extracted of the window W1, and the position of the window W1 is moved each time learning of the neural network 50 is performed. More specifically, the window W1 is moved in units of one pixel so that the center of the window W1 scans all the pixels of the training data 74, for example. In this way the training data 75 of the window size extracted from all the pixels of the training data 74 are used for learning of the neural network 50. Therefore, the degree of learning of the neural network 50 can be improved, and a deep learning algorithm having the structure of the neural network 60 shown in FIG. 3 is obtained as a result of deep learning.

Image Analysis Method Summary

In the image analysis method shown in FIG. 3, analysis data 80 are generated from an analysis target image (bright field image) 78 obtained by imaging a sample including a tissue or cells to be analyzed. The sample preferably is stained the same as the first training image. The analysis target image 78 also can be acquired as a color image, for example, using a known microscope, a virtual slide scanner or the like, for example. The analysis target image (bright field image) 78 may be an image including one or more primary colors. When color analysis target image 78 is encoded with color density values of each color of R, G, and B for each pixel, it is possible to express the entire image as an encoded diagram of color density values in each pixel of each R, G, B (analysis color density encoded diagrams 79*r*, 79*g*, 79*b*). Color density encoded diagrams 79*r*, 79*g*, and 79*b* indicating the codes of the color densities in the single color image of each color of R, G, and B shown in the example of FIG. 3 are obtained by substituting the three primary colors of images 79R, 79G, 79B with color density values represented by codes displayed in eight levels from 0 to 7.

The analysis data 80 are data obtained by extracting regions (that is, window sizes) having a predetermined number of pixels of the color density encoded diagrams 79*r*, 79*g*, and 79*b*, and the data of the tissue or cell included in the analysis target image 78 include color density values. Although the analysis data 80 has a simplified window size of 3×3 pixels for convenience of explanation similar to the training data 75, a preferable window size is, for example, about 113×113 pixels, and a size of a 3×3 nucleus of normal gastric epithelial cells is preferable in view of discrimination accuracy, for example, a field of view of 40 times which is about 113×113 pixels. For example, a window W2 of 3×3 pixels is set, and the window W2 is moved relative to the color density encoded diagrams 79*r*, 79*g*, and 79*b*. The center of the window W2 is located at any pixel of the color density encoded diagrams 79*r*, 79*g*, 79*b*, and the color density encoded diagrams 79*r*, 79*g*, 79*b* are displayed in a window W2 indicated by a black frame of 3×3 pixels to obtain window size analysis data 80. In this way the analysis data 80 are generated for each area including peripheral pixels around the predetermined pixel from the color density encoded diagrams 79*r*, 79*g*, and 79*b*. The predetermined pixel means the pixel of the color density encoded diagrams 79*r*, 79*g*, and 79*b* located at the center of the window W2, and the peripheral pixels are pixels within the window size range centered on the predetermined pixel of color density encoded diagrams 79*r*, 79*g*, 79*b*. In the analysis data 80, the color density values also are stored in the order of red (R), green (G) and blue (B) for each pixel similarly to the training data 74.

In the image analysis method, analysis data 80 are processed using a deep learning algorithm 60 having a neural network learned using the window size training data 75 shown in FIG. 1. Data 83 indicating whether a region is a cell nucleus region in the analysis target tissue or cell are generated by processing the analysis data 80.

Referring again to FIG. 3, the analysis data 80 cut out from the color density encoding diagrams 79*r*, 79*g*, and 79*b* of the respective colors R, G, and B are input to the neural network 60 configuring the deep learning algorithm. The number of nodes of the input layer 60*a* of the neural network 60 corresponds to the product of the number of input pixels and the number of primary colors included in the image. When the color density value data 81 of each pixel of the analysis data 80 are input to the neural network 60, an estimated value 82 (binary) of the pixel located at the center of the analysis data 80 is output from the output layer 60*b*. For example, when the estimated value is 1, the value indicates the region of the cell nucleus, and when the estimated value is 0, it indicates the other region. That is, the estimated value 82 output from the output layer 60*b* of the neural network 60 is data generated for each pixel of the analysis target image and is data indicating whether it is a cell nucleus region in the analysis target image. The estimated value 82 differentiates between the region of the cell nucleus and the other region by, for example, the value 1 and the value 0. The estimate value 82 is also called a label value and is also called a class in the description of the neural network in the following description. The neural network 60 generates a label indicating whether the region is a cell nucleus region relative to the pixel located at the center of the analysis data 80 among the input analysis data 80. In other words, the neural network 60 classifies the analysis data 80 into classes indicating the regions of cell nuclei contained in the analysis target image. Note that the color density value data 81 of each pixel is aggregate data of the color density values of each color of R, G, B of each pixel of the analysis data 80.

Thereafter, the analysis data 80 are extracted by window size while moving the window W2 by one pixel unit so that the center of the window W2 scans all pixels of the color density encoded diagrams 79*r*, 79*g*, and 79*b* of the respective colors R, G, B. The extracted analysis data 80 are input to the neural network 60. In this way binary data 83 are obtained as data indicating whether or not the region is a cell nucleus region in the analysis target image. In the example shown in FIG. 3, the cell nucleus region detection process also is performed on the binary data 83 to obtain a cell nucleus region weighted image 84 indicating a region of the cell nucleus. Specifically, the tumor cell nucleus region detection process is, for example, a process of detecting a pixel whose estimate value 82 is a value 1, and is a process of actually identifying the region of the cell nucleus. The cell nucleus region weighted image 84 is an image in which the region of the cell nucleus obtained by the image analysis process is displayed superimposed on the analysis target image 78. After determining the region of the cell nucleus, a process of displaying the cell nucleus and the other regions on the display device so as to be distinguishable also may be performed. For example, processing is performed such as filling the region of the cell nucleus with color, drawing a line between the region of the tumor cell nucleus and the other region and the like so as to be distinguishably displayed on the display device.

First Embodiment

In the first embodiment, the configuration of a system that implements the deep learning method and image analysis method described in the above outline will be specifically described.

Structure Summary

Figure 4:
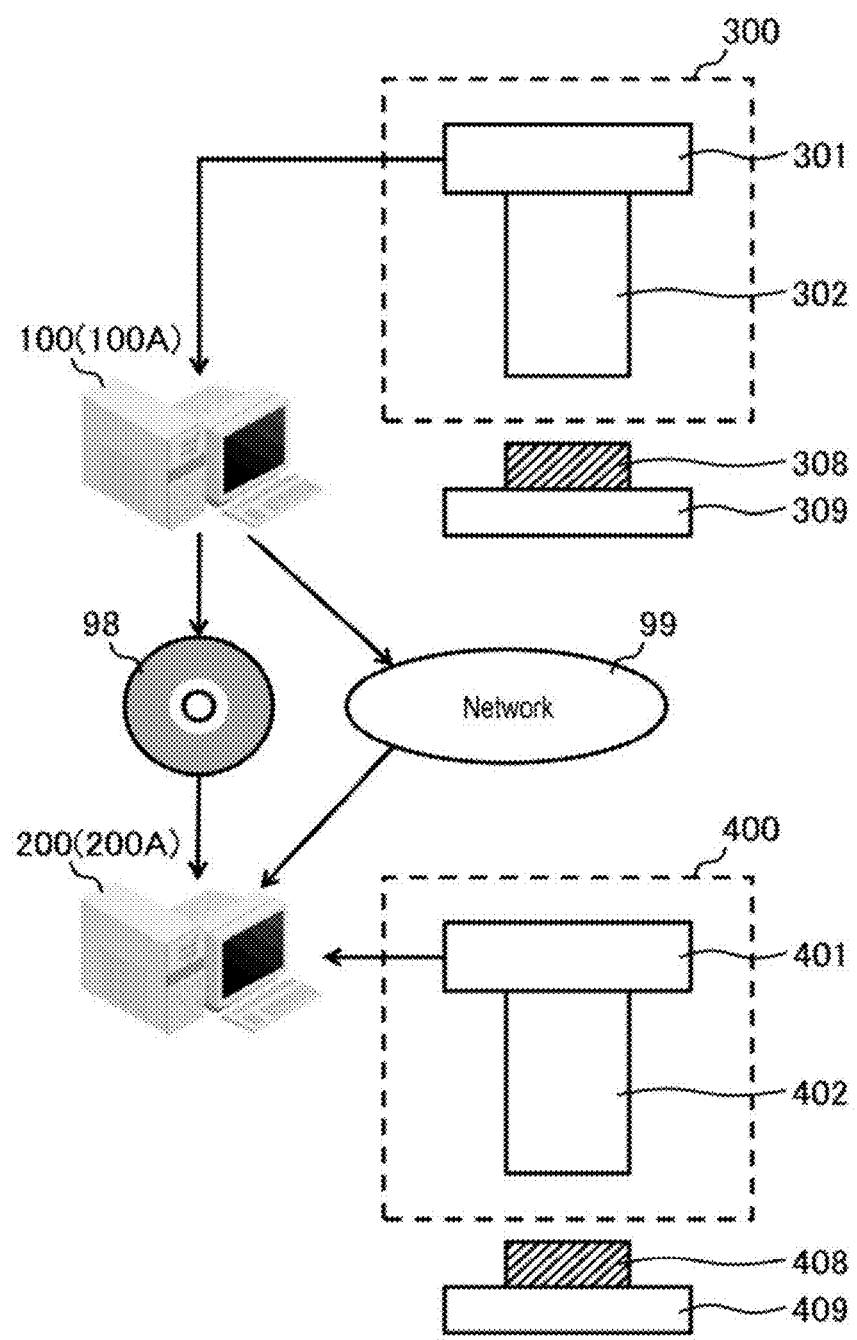
FIG. 4 is a schematic structural diagram of an image analysis system according to a first embodiment.

Referring to FIG. 4, the image analysis system according to the first embodiment includes a deep learning apparatus 100A and an image analysis apparatus 200A. The vendor side apparatus 100 operates as the deep layer learning apparatus 100A and the user side apparatus 200 operates as the image analysis apparatus 200A. The deep learning apparatus 100A learns using the training data in the neural network 50 and provides the user with a deep learning algorithm 60 that is trained with the training data. The deep learning algorithm configured by the learned neural network 60 is provided from the deep learning apparatus 100A to the image analysis apparatus 200A through a recording medium 98 or a network 99. The image analysis apparatus 200A analyzes an analysis target image using a deep learning algorithm configured by the learned neural network 60.

The deep layer learning apparatus 100A is configured by, for example, a general-purpose computer, and performs a deep learning process based on a flowchart to be described later. The image analysis apparatus 200A is configured by, for example, a general-purpose computer, and performs image analysis processing based on a flowchart to be described later. The recording medium 98 is a computer readable non-transitory tangible recording medium such as a DVD-ROM or a USB memory.

The deep learning apparatus 100A is connected to an imaging device 300. The imaging device 300 includes an imaging element 301 and a fluorescence microscope 302, and captures bright field images and fluorescence images of a learning sample 308 set on a stage 309. The learning sample 308 is subjected to the staining described above. The deep learning apparatus 100A acquires the first training image 70 and the second training image 71 captured by the imaging device 300.

The image analysis apparatus 200A is connected to the imaging device 400. The imaging device 400 includes an imaging element 401 and a fluorescence microscope 402, and captures a bright field image of an analysis target sample 408 set on the stage 409. The analysis target sample 408 is stained in advance as described above. The image analysis apparatus 200A acquires the analysis target image 78 captured by the imaging device 400.

A known fluorescence microscope, a virtual slide scanner or the like having a function of imaging a sample can be used as the imaging devices 300 and 400. The imaging device 400 also may be an optical microscope insofar as it has a function of imaging a sample.

Hardware Structure

Figure 5:
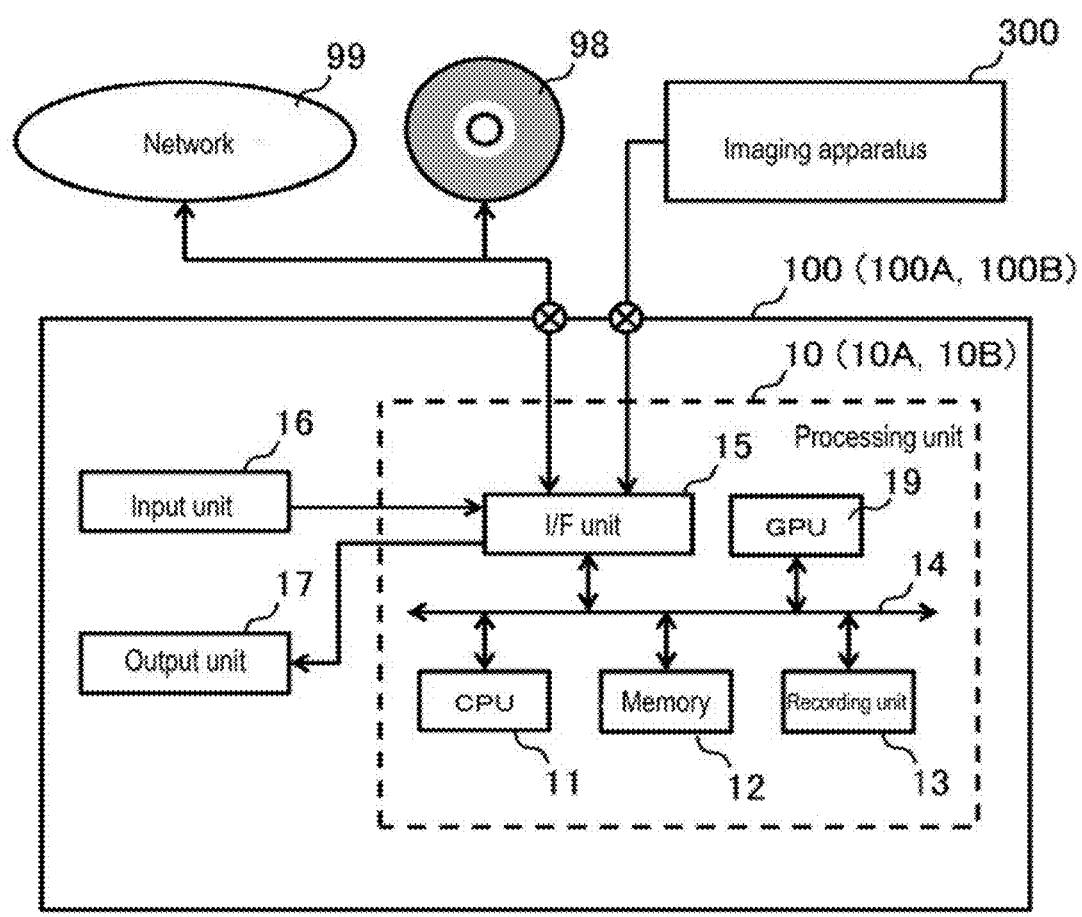
FIG. 5 is a block diagram showing a hardware configuration of a vendor-side apparatus 100.

Referring to FIG. 5, the vendor side apparatus 100 (100A, 100B) includes processing units 10 (10A, 10B), an input unit 16, and an output unit 17.

The processing unit 10 includes a CPU (Central Processing Unit) 11 that performs data processing to be described later, a memory 12 used as a work area for data processing, a recording unit 13 that records programs and processing data described later, a bus 14 for transmitting data, an interface unit 15 for inputting and outputting data with an external device, and a GPU (Graphics Processing Unit) 19. The input unit 16 and the output unit 17 are connected to the processing unit 10. Illustratively, the input unit 16 is an input device such as a keyboard or a mouse, and the output unit 17 is a display device such as a liquid crystal display. The GPU 19 functions as an accelerator for assisting arithmetic processing (for example, parallel arithmetic processing) performed by the CPU 11. That is, the process performed by the CPU 11 in the following description means that the process includes a process performed by the CPU 11 using the GPU 19 as an accelerator.

In order to perform the process of each step described below with reference to FIG. 8, the processing unit 10 pre-records the program and the neural network 50 of the present invention in the recording unit 13 before learning, for example, in an executable form. The execution form is, for example, a form generated by being converted from a programming language by a compiler. The processing unit 10 performs processing using the program recorded in the recording unit 13 and the neural network 50 before learning.

Unless otherwise specified in the following description, processing performed by the processing unit 10 means processing performed by the CPU 11 based on the program stored in the recording unit 13 or the memory 12 and the neural network 50. The CPU 11 temporarily stores necessary data (such as intermediate data being processed) with the memory 12 as a work area, and appropriately records data for long term storage, such as calculation results, in the recording unit 13.

Figure 6:
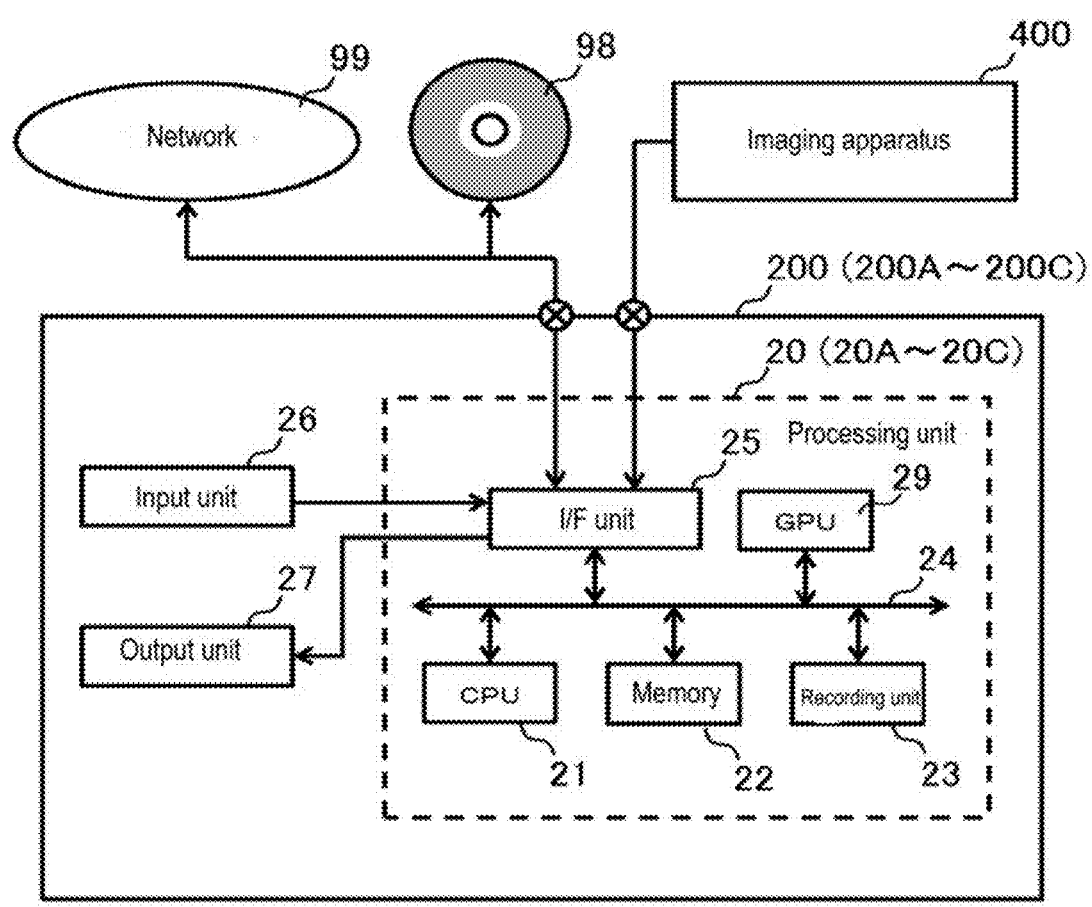
FIG. 6 is a block diagram showing a hardware configuration of a user apparatus 200.

Referring to FIG. 6, the user side apparatus 200 (200A, 200B, 200C) includes a processing unit 20 (20A, 20B, 20C), an input unit 26, and an output unit 27.

The processing unit 20 includes a CPU (Central Processing Unit) 21 for performing data processing to be described later, a memory 22 used as a work area for data processing, a recording unit 23 for recording programs and processing data described later, a bus 24 for transmitting data, an interface section 25 for inputting and outputting data with an external device, and a GPU (Graphics Processing Unit) 29. The input unit 26 and the output unit 27 are connected to the processing unit 20. Illustratively, the input unit 26 is an input device such as a keyboard or a mouse, and the output unit 27 is a display device such as a liquid crystal display. The GPU 29 functions as an accelerator for assisting arithmetic processing (for example, parallel arithmetic processing) performed by the CPU 21. That is, the process performed by the CPU 21 in the following description means that the process includes a process performed by the CPU 21 using the GPU 29 as an accelerator.

In order to perform the processes of each step described below with reference to FIG. 13, the processing unit 20 records in advance the program according to the present invention and the learned neural network structure deep layer learning algorithm 60, for example, in an executable format in the recording unit 23. The execution form is, for example, a form generated by being converted from a programming language by a compiler. The processing unit 20 performs processing using the program recorded in the recording unit 23 and the deep learning algorithm 60.

Unless otherwise stated in the following description, the processing performed by the processing unit 20 means the processing actually performed by the processing unit 20 based on the program stored in the recording unit 23 or the memory 22 and the deep learning algorithm 60. The CPU 21 temporarily stores necessary data (such as intermediate data being processed) with the memory 22 as a work area, and appropriately records data for long term storage, such as calculation results, in the recording unit 23.

Function Block and Processing Procedure

Deep Learning Process

Figure 7:
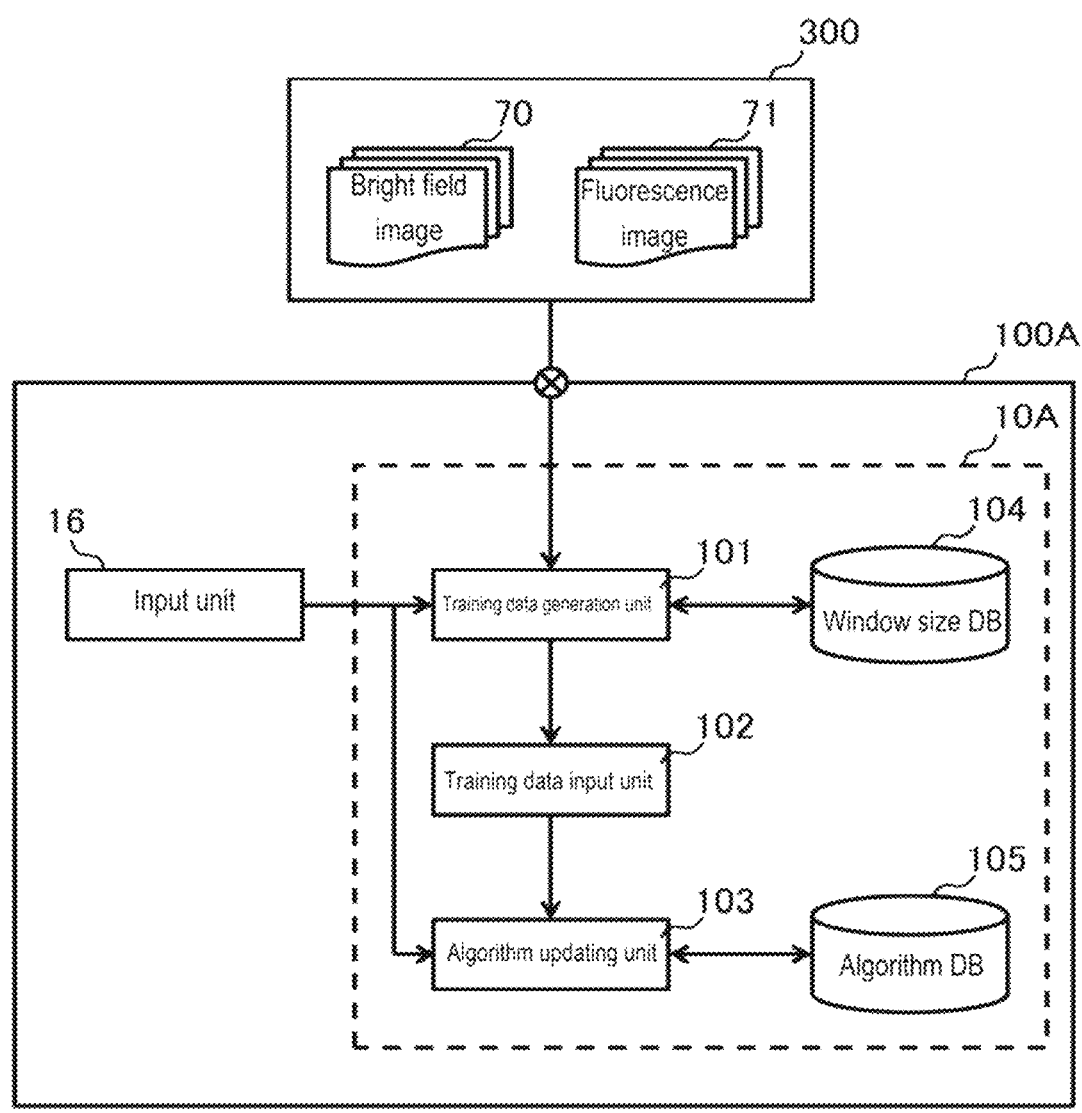
FIG. 7 is a block diagram illustrating functions of the deep learning apparatus 100A according to the first embodiment.

Referring to FIG. 7, the processing unit 10A of the deep learning apparatus 100A according to the first embodiment includes a training data generating unit 101, a training data input unit 102, and an algorithm updating unit 103. These functional blocks are realized by installing a program that causes a computer to execute a deep layer learning process in the recording unit 13 or the memory 12 of the processing unit 10A and executing this program by the CPU 11. The window size database 104 and the algorithm database 105 are recorded in the recording unit 13 or the memory 12 of the processing unit 10A.

The first training image 70 and the second training image 71 of the sample for learning are captured in advance by the imaging device 300 and stored in advance in the recording unit 13 or the memory 12 of the processing unit 10A. The neural network 50 is stored in advance in the algorithm database 105 in association with, for example, the type (for example, organization name) of the tissue sample from which the analysis target sample is derived or the type of sample including cells.

Figure 8:
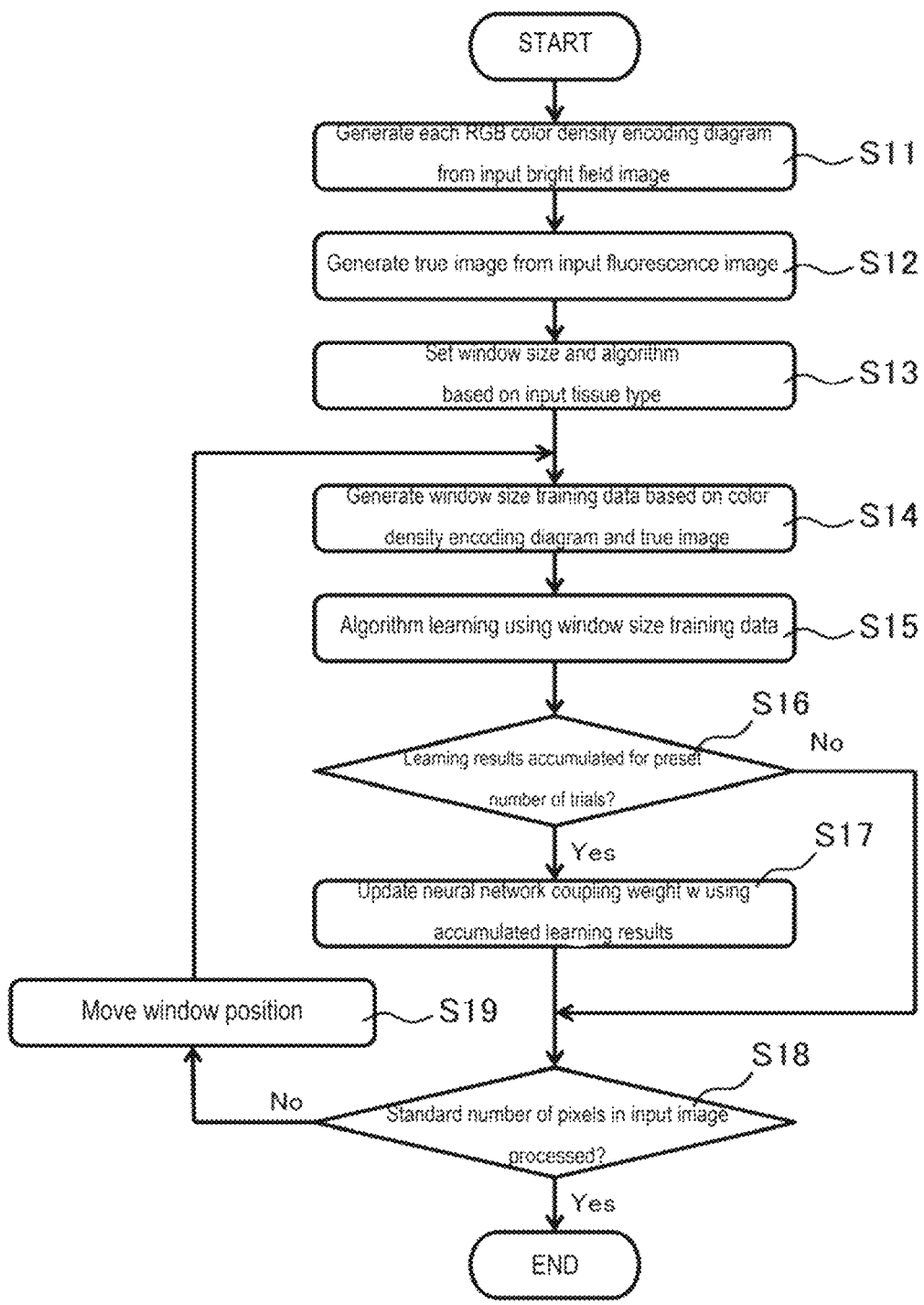
FIG. 8 is a flowchart showing a procedure of a deep learning process.

The processing unit 10A of the deep learning apparatus 100A performs the process shown in FIG. 8. When describing each function block shown in FIG. 7, the processes of steps S11 to S13, S18 and S19 are performed by the training data generating unit 101. The process of step S14 is performed by the training data input unit 102. The processes of steps S15 to S17 are performed by the algorithm updating unit 103.

In steps S11 to S19 described below, a deep learning process for a pair of a first training image 70 (bright field images) and a second training image (second training image 71) will be described.

In step S11, the processing unit 10A generates color density encoded diagrams 72r, 72g, and 72b for R, G, B colors from the input first training image 70. The color density encoded diagrams 72r, 72g, and 72b are created by stepwise expression of the color density values of the respective colors of R, G, and B of each pixel of the first training image 70. In the present embodiment, color density encoding diagrams 72r, 72g, and 72b are created for each R, G, B gradation image with the color density value set to 8 levels from 0 to 7. Assignment of a color density value is carried out, for example, by setting the lowest brightness as the color density value 0, gradually assigning a higher value as the degree of brightness increases, and setting the highest brightness as the color density value 7.

In step S12, the processing unit 10A binarizes the gradation of each pixel of the input second training image 71 to generate a true value image 73. The true value image 73 (binarized image 73) is used to generate training data to cause the neural network 50 to learn a correct interpretation. The binarization process is performed, for example, by comparing the gradation of each pixel in the image with a predetermined threshold value.

In step S13, the processing unit 10A receives input of the type of tissue for learning from the operator on the side of the deep learning apparatus 100A via the input unit 16. The processing unit 10A sets the window size by referring to the window size database 104 based on the type of the input tissue and refers to the algorithm database 105 to set the neural network 50 used for learning. In the present embodiment in which a stomach tissue sample analysis target, the window size is, for example, 113×113 pixels. This pixel size is a size in an image captured at, for example, 40 times magnification. Illustratively, it is a size that supports that the entire shape of the cell nucleus region of at least one cell out of two to nine cells is included in the window. The window size is a unit of training data to be input to the neural network 50 at the time of one input, and the product of the number of pixels of the tumor site training data 75 of the window size and the number of the primary colors included in the image corresponds to the number of nodes of the input layer 50a. The window size is associated with the type of the tissue sample or the type of the sample including cells and recorded in advance in the window size database 104.

In step S14, the processing unit 10A generates the window size training data 75 from the color density encoded diagrams 72r, 72g, and 72b and the true image 73. Specifically, in the "Summary of the Deep Learning Method" as described above with reference to FIGS. 2A to 2C, the training data 75 of the window size is created by the window W 1 from the training data 74 of the combined color density encoded diagrams 72r, 72g, and 72b and the true image 73.

In step S15 shown in FIG. 8, the processing unit 10A learns the neural network 50 using the window size training data 75. The learning result of the neural network 50 is accumulated each time the neural network 50 learns using the window size training data 75.

In the image analysis method according to the embodiment, since a convolutional neural network is used and the stochastic gradient descent method is used, in step S16, the processing unit 10A determines whether learning results for a predetermined number of trials are accumulated. The processing unit 10A performs the processing of step S17 when the learning results are accumulated for a predetermined number of trials, and the processing unit 10A performs the processing of step S18 when the learning results are not accumulated for a predetermined number of trials.

When learning results have been accumulated for a predetermined number of trials, in step S17 the processing unit 10A updates the coupling weight w of the neural network 50 using the learning results accumulated in step S15. In the image analysis method according to the embodiment, since the stochastic gradient descent method is used, the coupling weight w of the neural network 50 is updated when the learning results for a predetermined number of trials are accumulated. Specifically, the process of updating the coupling weight w is a process of performing calculation by the gradient descent method shown in (Equation 11) and (Equation 12) described later.

In step S18, the processing unit 10A determines whether the specified number of pixels in the input image have been processed. The input image is the training data 74; when a series of processes from step S14 to step S17 has been performed for the specified number of pixels in the training data 74, the deep learning process is terminated. Learning by the neural network does not necessarily have to be performed for all pixels in the input image, and the processing unit 10A can perform learning by processing a part of pixels in the input image, that is, a prescribed number of pixels. The prescribed number of pixels also may be all pixels in the input image.

When the prescribed number of pixels in the input image have not been processed, in a step S19 the processing unit 10A moves the center position of the window one pixel unit in the training data 74 as shown in FIG. 2C. Thereafter, the processing unit 10A performs a series of processes from step S14 to step S17 at the new window position after movement. That is, in step S14 the processing unit 10A extracts the training data 74 in the window size at the new window position after the movement. Subsequently, in step S15, the processing unit 10A causes the neural network 50 to learn using the newly cut window size training data 75. When learning results for a predetermined number of trials are accumulated in step S16, the processing unit 10A updates the coupling weight w of the neural network 50 in step S17. Learning of the neural network 50 for each window size is performed for a specified number of pixels in the training data 74.

The degree of learning of the neural network 50 is improved by repeating the deep learning processes of steps S11 to S19 for a pair of input image relative to a plurality of pairs of different input images. In this way a deep learning algorithm 60 of the neural network structure shown in FIG. 3 is obtained.

Neural Network Structure

Figure 9A:
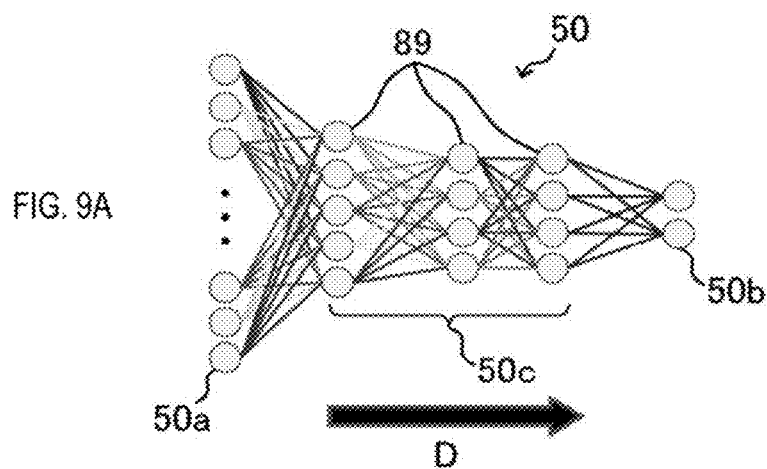
FIGS. 9A-9C are schematic diagrams illustrating details of learning by a neural network.

In the first embodiment shown in FIG. 9A, a neural network of a deep learning type is used. The neural network of the deep learning type is configured by an input layer 50a, an output layer 50b, and an intermediate layer 50c between the input layer 50a and the output layer 50b, and the intermediate layer 50c is configured by a plurality of layers as in the neural network shown in FIG. 9A. The number of layers configuring the intermediate layer 50c, for example, may be five or more.

In the neural network 50, a plurality of nodes 89 arranged in layers are connected between layers. In this way information propagates from the input side layer 50a to the output side layer 50b only in one direction indicated by an arrow D in the drawing. In the present embodiment, the number of nodes of the input layer 50a corresponds to the product of the number of pixels of the input image, that is, the number of pixels of the window W1 shown in FIG. 2C and the number of primary colors included in each pixel. Since the pixel data (color density values) of the image can be input to the input layer 50a, the user can input the input image to the input layer 50a without separately calculating the feature amount from the input image.

Operation at Each Node

Figure 9B:
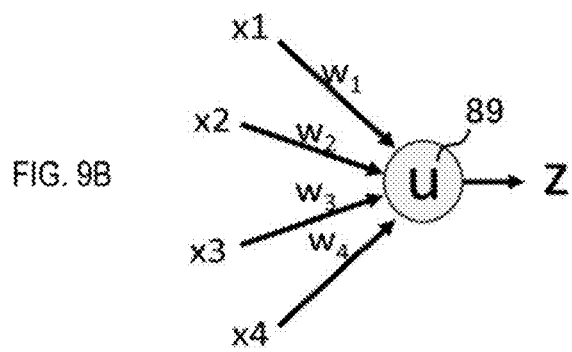

FIG. 9B is a schematic diagram showing the operation at each node. Each node 89 receives a plurality of inputs and calculates one output (z). In the example shown in FIG. 9B, the node 89 receives four inputs. The total input (u) received by the node 89 is expressed by the following (Equation 1).

Function 1

$$u = w_1 x_1 + w_2 x_2 + w_3 x_3 + w_4 x_4 + b \quad \text{(Equation 1)}$$

Each input is multiplied by a different weight. In equation (1), b is a value called bias. The output (z) of the node is an output of a predetermined function f relative to the total input (u) represented by (Equation 1), and is expressed by the following (Equation 2). The function f is called an activation function.

Function 2

$$z = f(u) \quad \text{(Equation 2)}$$

Figure 9C:
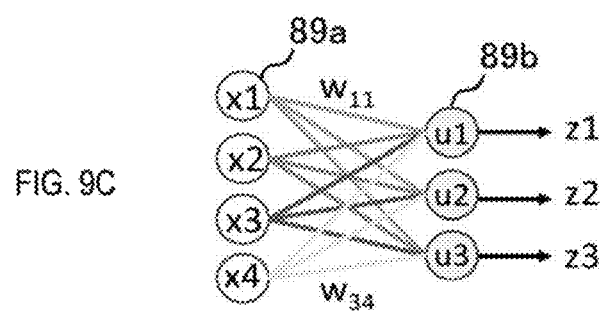

FIG. 9C is a schematic diagram showing the operation between the nodes. In the neural network 50, the nodes that output the result (z) represented by (Equation 2) are arranged in a layered manner relative to the total input (u) represented by (Equation 1). The output of the node of the previous layer becomes the input of the node of the next layer. In the example shown in FIG. 9C, the output of the node 89a on the layer on the left side in the figure becomes the input to the node 89b on the layer on the right side in the figure. Each node 89b of the right side layer receives an output from a node 89a on the left side layer, respectively. Different weights are applied to each coupling between each node 89a on the left side layer and each node 89b on the right side layer. Output of each of the plurality of nodes 89a on the left side layer is designated x1~x4, and the inputs to each of the three nodes 89b on the right side layer are represented by (Equation 3-1) to (Equation 3-3) below.

Function 3

$$u_1 = w_{11} x_1 + w_{12} x_2 + w_{13} x_3 + w_{14} x_4 + b_1 \quad \text{(Equation 3-1)}$$

$$u_2 = w_{21} x_1 + w_{22} x_2 + w_{23} x_3 + w_{24} x_4 + b_2 \quad \text{(Equation 3-2)}$$

$$u_3 = w_{31} x_1 + w_{32} x_2 + w_{33} x_3 + w_{34} x_4 + b_3 \quad \text{(Equation 3-3)}$$

Generalizing these (Equation 3-1) to (Equation 3-3) results in (Equation 3-4). Here, i=1, . . . I, j=1, . . . J.

Function 4

$$u_j = \sum_{i=1}^{I} w_{ji} x_i + b_j \quad \text{(Equation 3-4)}$$

Applying Equation 3-4 to the activation function yields the output. The output is expressed by the following (Equation 4).

Function 4

$$z_j = f(u_j) \ (j=1,2,3) \quad \text{(Equation 4)}$$

Activation Function

In the image analysis method according to the embodiment, a rectified linear unit function is used as the activation function. The rectified linear unit function is expressed by the following (Equation 5).

Function 6

$$f(u) = \max(u, 0) \quad \text{(Equation 5)}$$

Equation 5 is a function that sets u=0 among u=0 in the linear function of z=u. In the example shown in FIG. 9C, the output of the node with j=1 is expressed by the following equation according to Equation 5.

Function 7

$$z_1 = \max((w_{11} x_1 + w_{12} x_2 + w_{13} x_3 + w_{14} x_4 + b_1), 0)$$

Neural Network Learning

Let y (x: w) be the function expressed using the neural network, the function y (x: w) changes as the parameter w of the neural network changes. Adjusting the function y (x: w) so that the neural network selects a more suitable parameter w for the input x is referred to as learning of the neural network. Suppose that multiple sets of inputs and outputs of functions expressed using a neural network are given. Assuming that the desired output for an input x is d, the input/output set is $\{(x_1, d_1), (x_2, d_2), \ldots, (x_n, d_n)\}$. The set of each set represented by (x, d) is referred to as training data. Specifically, the set of a set of color density values for each pixel and a label for a true value image in a single color image of each color of R, G, B shown in FIG. 2B is the training data shown in FIG. 2A.

Learning by a neural network means that when input xn is given to any input/output pair (xn, dn), weight w is adjusted so that the output y (xn: w) of the neural network is as close as possible to the output dn. An error function is a measure for measuring the proximity between a function expressed using a neural network and training data.

Function 8

$$y(x_n; w) \sim d_n$$

The error function is also referred to as a loss function. The error function E(w) used in the image analysis method according to the embodiment is represented by the following (Equation 6). Equation 6 is referred to as cross entropy.

Function 9

$$E(w) = -\sum_{n=1}^{N} \sum_{k=1}^{K} d_{nk} \log y_k(x_n; w) \quad \text{(Equation 6)}$$

A method of calculating the cross entropy of (Equation 6) will be described. In the output layer 50b of the neural network 50 used in the image analysis method according to the embodiment, that is, in the final layer of the neural network, an activation function is used for classifying the input x into a finite number of classes according to the content. The activation function is called a softmax function and is expressed below (Equation 7). Note that it is assumed that the same number of nodes as the class number k are arranged in the output layer 50b. The total input u of each node k (k=1, . . . , K) of the output layer L is obtained from the output of the previous layer L−1 by uk(L) respectively. In this way the output of the kth node of the output layer can be expressed as follows (Equation 7).

Function 10

$$y_k \equiv z_k^{(L)} = \frac{\exp(u_k^{(L)})}{\sum_{j=1}^{K} \exp(u_j^{(L)})} \quad \text{(Equation 7)}$$

Equation 7 is a softmax function. The output $y_1, \ldots, y_K$ Is always 1.

Each class is expressed as $C_1, \ldots, C_K$, and the output y of the node k of the output layer $L_K$(that is, $u_K^{(L)}$) indicates the probability that given input x belongs to class $C_K$. Please refer to Equation 8 below. The input x is classified into a class having the maximum probability represented by Equation 8.

Function 11

$$p(C_k|x)=y_k=z_k^{(L)} \qquad \text{(Equation 8)}$$

In the learning of the neural network, the function expressed by the neural network is regarded as a model of the posterior probability of each class, and the likelihood of the weight w relative to the training data under such a probability model is evaluated and a weight w that maximizes likelihood is selected.

The target output $d_n$ by the softmax function of (Equation 7) is set to 1 only when the output is a correct class, and 0 if the output is otherwise. When the target output is expressed in vector form $d_n=[d_{n1}, \ldots, d_{nK}]$, for example, when the correct class of input $x_n$ is C3, only the target output dn3 is 1, and the other target outputs are 0. When encoding in this manner, the posterior distribution is represented as follows (Equation 9).

Function 12

$$p(d|x)=\Pi_{k=1}^{K} p(C_k|x)^{d_k} \qquad \text{(Equation 9)}$$

The likelihood L(w) of weight w relative to the training data {(xn, dn)} (n=1, ..., N) is expressed below (Equation 10). The error function of Equation 6 is derived by taking the logarithm of the likelihood L(w) and inverting the sign.

Function 13

$$L(w) = \prod_{n=1}^{N} p(d_n|x_n; w) =$$

$$\prod_{n=1}^{N} \prod_{n=1}^{K} p(C_k|x_n)^{d_{nk}} = \prod_{n=1}^{N} \prod_{k=1}^{K} (y_k(x; w))^{d_{nk}} \qquad \text{(Equation 10)}$$

Learning means minimizing the error function E(w) calculated based on the training data for the parameter w of the neural network. In the image analysis method according to the embodiment, the error function E(w) is expressed by (Equation 6).

Minimizing the error function E(w) for the parameter w has the same meaning as finding the local minima of the function E(w). The parameter w is the weight of the coupling between the nodes. The minimum point of the weight w is obtained by iterative calculation that iteratively updates the parameter w using an arbitrary initial value as a starting point. An example of such a calculation is the gradient descent method.

In the gradient descent method, a vector expressed by the following Equation 11 is used.

Function 14

$$\nabla E = \frac{\partial E}{\partial w} = \left[\frac{\partial E}{\partial w_1}, \ldots, \frac{\partial E}{\partial w_M}\right]^T \qquad \text{(Equation 11)}$$

In the gradient descent method, the process of moving the value of the current parameter w in the negative gradient direction (that is, $-\nabla E$) is repeated many times. When the current weight is designated w(t) and the weight after movement is w(t+1), the calculation by the gradient descent method is represented by the following Equation 12. The value t means the number of times the parameter w has been moved.

Function 15

$$w^{(t+1)}=w^{(t)}-\epsilon\nabla E \qquad \text{(Equation 12)}$$

The symbol

Function 16

$$\epsilon$$

is a constant that determines the magnitude of the update amount of the parameter w, and is referred to as a learning coefficient. By repeating the operation represented by (Equation 12), the error function E(w)(t)) decreases as the value t increases, and the parameter w reaches the minimum point.

Note that the calculation according to Equation 12 may be performed on all the training data (n=1, ..., N) or may be performed only on a part of the training data. The gradient descent method performed for only some of the training data is referred to as the stochastic gradient descent method. A stochastic gradient descent method is used in the image analysis method according to the embodiment.

Image Analysis Process

Figure 10:
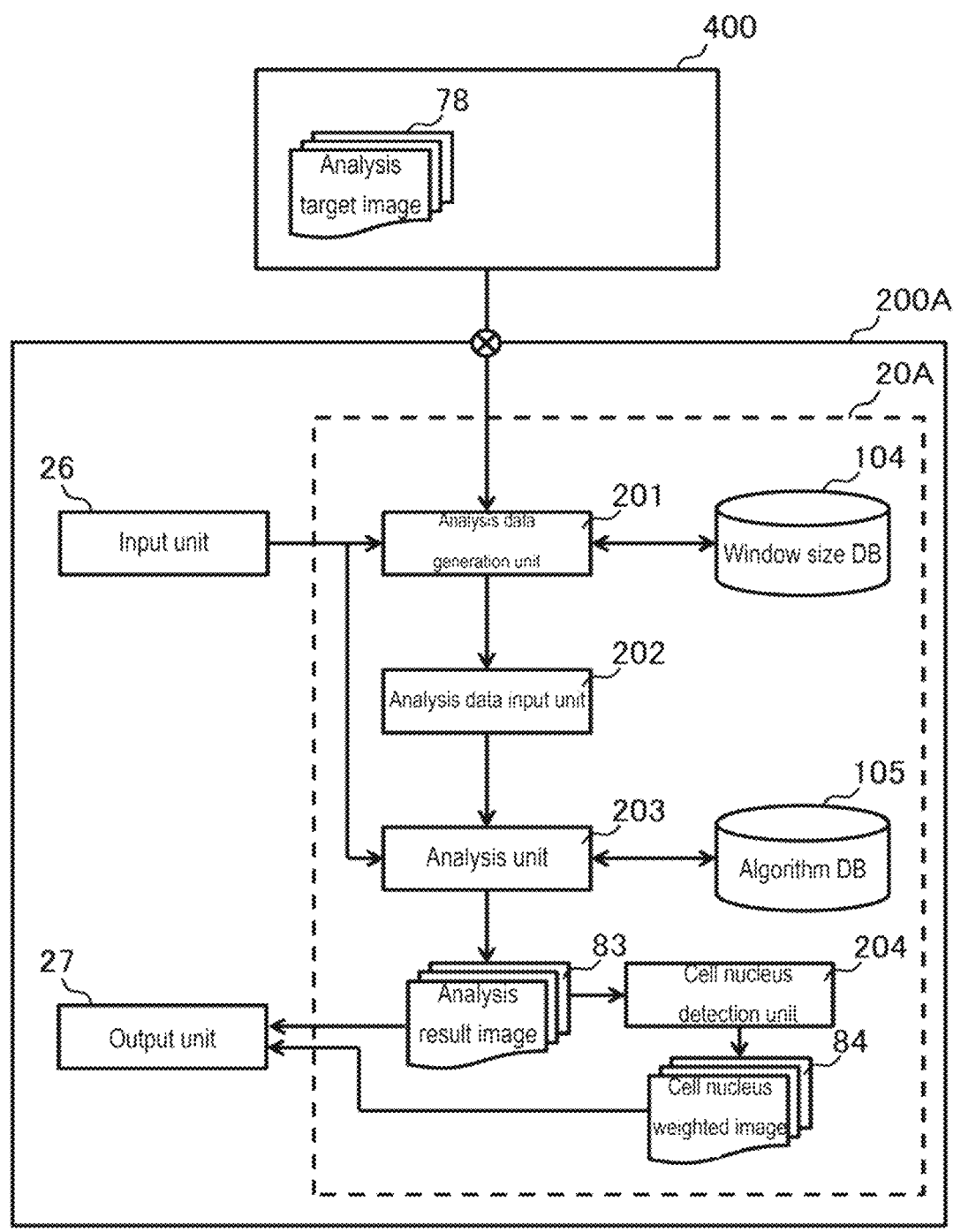
FIG. 10 is a block diagram illustrating functions of the image analysis apparatus 200A according to the first embodiment.

Referring to FIG. 10, the processing unit 20A of the image analysis apparatus 200A according to the first embodiment includes an analysis data generation unit 201, an analysis data input unit 202, an analysis unit 203, and a tumor cell nucleus region detection unit 204. These functional blocks are realized by installing a program according to the present invention for causing a computer to execute an image analysis process in the recording unit 23 or the memory 22 of the processing unit 20A and executing this program by the CPU 21. The window size database 104 and the algorithm database 105 are provided from the deep learning apparatus 100A through the recording medium 98 or the network 99, and recorded in the recording unit 23 or the memory 22 of the processing unit 20A.

The analysis target image 78 of the analysis target tissue is captured in advance by the imaging device 400, and recorded in the recording unit 23 or the memory 22 of the processing unit 20A in advance. The deep learning algorithm 60 including the learned coupling weight w is stored in the algorithm database 105 in association with the type of tissue sample (for example, tissue name) from which the sample of the analysis target tissue is derived or the type of sample including cells, and functions as a program module which is a part of a program that causes a computer to execute an image analysis process. That is, the deep learning algorithm 60 is used in a computer having a CPU and a memory, and causes the computer to function to execute computation or processing of specific information corresponding to the purpose of use, such as outputting data indicating whether the region is the cell nucleus in the analysis target tissue. Specifically, the CPU 21 of the processing unit 20A performs the calculation of the neural network 60 based on the learned coupling weight w in accordance with the algorithm prescribed in the deep learning algorithm 60 recorded in the recording unit 23 or the memory 22. The CPU 21 of the processing unit 20A performs an operation on the captured analysis target image 78 of the analysis target tissue which is input to the input layer 60a and output from the output layer 60b binary image 83 of the data indicating whether the region is a cell nucleus in the analysis target tissue.

Figure 11:
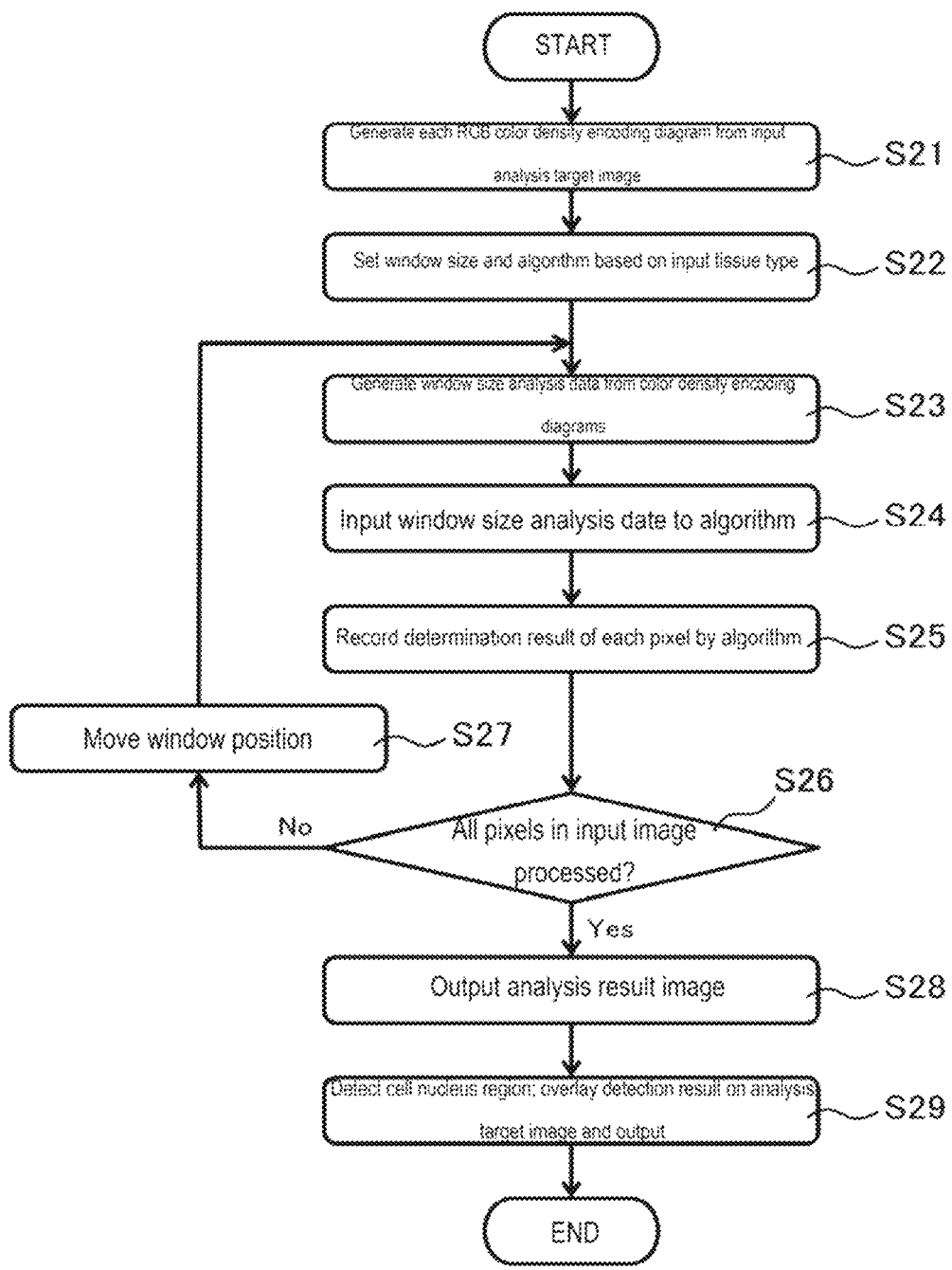
FIG. 11 is a flowchart showing a procedure of image analysis processing.

Referring to FIG. 11, the processing unit 20A of the image analysis apparatus 200A performs the processes shown in FIG. 11. When describing each function block shown in FIG. 10, the processes of steps S21 and S22 are performed by the analysis data generation unit 201. The processes of steps S23, S24, S26, and S27 are performed by the analysis data input unit 202. The processes of steps S25 and S28 are performed by the analysis unit 203. The process of step S29 is performed by the cell nucleus region detection unit 204.

In step S21, the processing unit 20A generates color density encoded diagrams 79r, 79g, and 79b of R, G, and B colors from the input analysis target image 78. The generation method of the color density encoded diagrams 79r, 79g, and 79b is the same as the generation method of step S11 at the time of the deep learning process shown in FIG. 8.

In step S22 shown in FIG. 11, the processing unit 20A accepts the input of the tissue type from the user on the image analysis apparatus 200A side as the analysis condition through the input unit 26. The processing unit 20A refers to the window size database 104 and the algorithm database 105 on the basis of the entered tissue type to set the window size used for analysis, and acquires the deep learning algorithm 60 used for analysis. The window size is a unit of analysis data to be input to the neural network 60 at the time of one input, and the product of the number of pixels of the window size analysis data 80 and the number of primary colors included in the image corresponds to the number of nodes of input layer 60a. The window size is associated with the tissue type, and stored in the window size database 104 in advance. The window size is, for example, 3×3 pixels as shown in the window W2 of FIG. 3. The deep learning algorithm 60 is also recorded in advance in the algorithm database 105 shown in FIG. 10 in association with the type of the tissue sample or the type of the sample including cells.

In step S23 shown in FIG. 11, the processing unit 20A generates the window size analysis data 80 from the color density encoded diagrams 79r, 79g, and 79b.

In step S24, the processing unit 20A inputs the analysis data 80 shown in FIG. 3 to the deep learning algorithm 60. The initial position of the window is, for example, a position at the center of 3×3 pixels in the window corresponding to the upper left corner of the analysis target image, as in step S15 in the deep learning process. When the processing unit 20A inputs the data 81 of a total of 27 color density values of 3×3 pixels×3 primary colors included in the window size analysis data 80 to the input layer 60a, the deep learning algorithm 60 outputs determination result 82 to the output layer 60b.

In step S25 shown in FIG. 11, the processing unit 20A records the determination result 82 output to the output layer 60b shown in FIG. 3. The determination result 82 is an estimated value (binary) of pixels located at the center of the color density encoded diagrams 79r, 79g, and 79b, which are analysis targets. For example, when the estimated value is 1, the value indicates the region of the cell nucleus, and when the estimated value is 0, it indicates the other region.

In step S26 shown in FIG. 11, the processing unit 20A determines whether all the pixels in the input image have been processed. The input image is the color density encoded diagrams 79r, 79g, and 79b shown in FIG. 3, and the process of step S28 is performed for all the pixels in the color density encoded diagrams 79r, 79g, and 79b when the series of processes from step S23 to step S25 shown in FIG. 11 have been performed.

When all the pixels in the input image have not been processed, in step S27 the processing unit 20A moves the center position of the window W2 by one pixel unit within the color density encoded diagrams 79r, 79g, and 79b shown in FIG. 3 similarly to step S19 in the deep learning process. Thereafter, the processing unit 20A performs a series of processes from step S23 to step S25 at the position of the new window W2 after movement. In step S25, the processing unit 20A records the determination result 82 corresponding to the new window position after the movement. A binary image 83 of the analysis result is obtained by recording the discrimination result 82 for each window size on all the pixels in the analysis target image. The image size of the binary image 83 as the analysis result is the same as the image size of the analysis target image. Here, in the binary image 83, the value 1 and the value 0 of the estimate value may be numerical data attached to each pixel, and in place of the estimate value 1 and 0, for example, the value 1 and the value 0 may be displayed in a display color associated with each of them.

In step S28 shown in FIG. 11, the processing unit 20A outputs the binary image 83 of the analysis result to the output unit 27.

In step S29 following step S28, the processing unit 20A also performs a cell nucleus region detection process on the cell nucleus region of the binary image 83 of the analysis result. In the binary image 83, the region of the cell nucleus and the other regions are distinguished and represented by binary values. Therefore, in the binary image 83, it is possible to discriminate the region of the cell nucleus by detecting the position of the pixel whose estimate value of the pixel changes from 1 to 0 or the pixel changing from 0 to 1. As another embodiment, it also is possible to detect the boundary between the region of the cell nucleus and the other region, that is, detect the region of the cell nucleus.

Although optional, the processing unit 20A may create a cell nucleus region weighted image 84 by superimposing the region of the obtained cell nucleus on the analysis target image 78. The processing unit 20A outputs the created cell nucleus region weighted image 84 to the output unit 27, and ends the image analysis process.

As described above, the user of the image analysis apparatus 200A can acquire the binary image 83 as the analysis result by inputting the analysis target image 78 of the analysis target tissue to the image analysis apparatus 200A. The binary image 83 represents the region of the cell nucleus and other regions in the analysis target sample, and the user can discriminate the region of the cell nucleus in the analysis target sample.

The user of the image analysis apparatus 200A also can acquire the cell nucleus region weighted image 84 as the analysis result. The cell nucleus region weighted image 84 is generated, for example, by filling the region of the cell nucleus with a color in the analysis target image 78. In another embodiment, the cell nucleus region weighted image 84 is generated by overlapping a boundary line between a region of cell nucleus and another region. In this way the user can grasp the region of the cell nucleus at a glance in the analysis target tissue.

Showing the region of the cell nucleus in the analysis target sample helps a person not familiar with the sample to understand the state of the cell nucleus.

Second Embodiment

Hereinafter, the image analysis system according to the second embodiment will be described with respect to points different from the image analysis system according to the first embodiment.

Structure Summary

Figure 12:
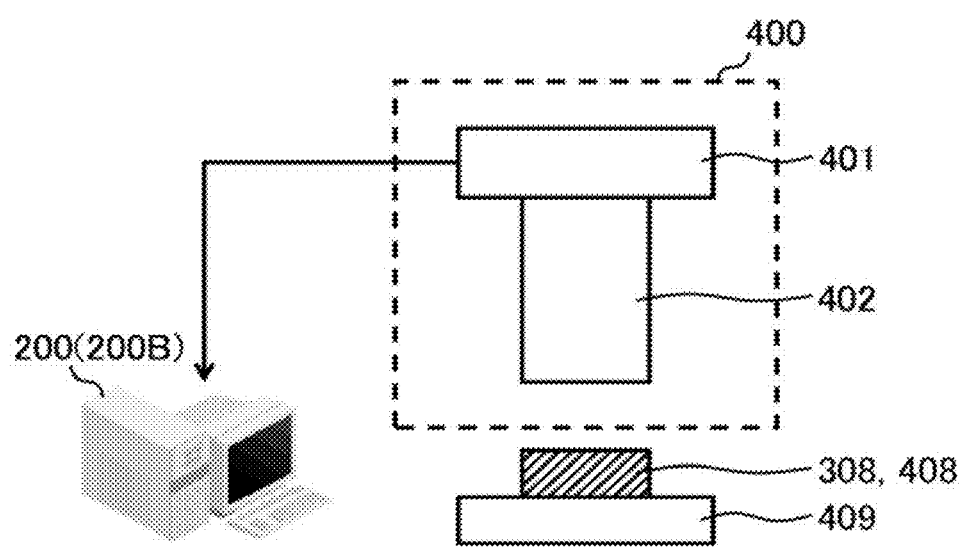
FIG. 12 is a schematic configuration diagram of an image analysis system according to a second embodiment.

Referring to FIG. 12, the image analysis system according to the second embodiment includes a user side apparatus 200, and the user side apparatus 200 operates as an integrated image analysis apparatus 200B. The image analysis apparatus 200B is configured by, for example, a general-purpose computer, and performs both of the deep learning process and the image analysis process described in the first embodiment. That is, the image analysis system according to the second embodiment is a stand-alone system that performs deep learning and image analysis on the user side. The image analysis system according to the second embodiment differs from the image analysis system according to the first embodiment in that the integrated type image analysis apparatus 200B installed on the user side has the functions of both the deep learning apparatus 100A and the image analysis apparatus 200A according to the first embodiment.

The image analysis apparatus 200B is connected to the imaging apparatus 400. At the time of the deep learning process, the imaging apparatus 400 acquires the first training image 70 and the second training image 71 of the learning tissue, and acquires the analysis target image 78 of the analysis target tissue at the time of the image analysis process.

Hardware Structure

The hardware configuration of the image analysis apparatus 200B is similar to the hardware configuration of the user side apparatus 200 shown in FIG. 6.

Function Block and Processing Procedure

Figure 13:
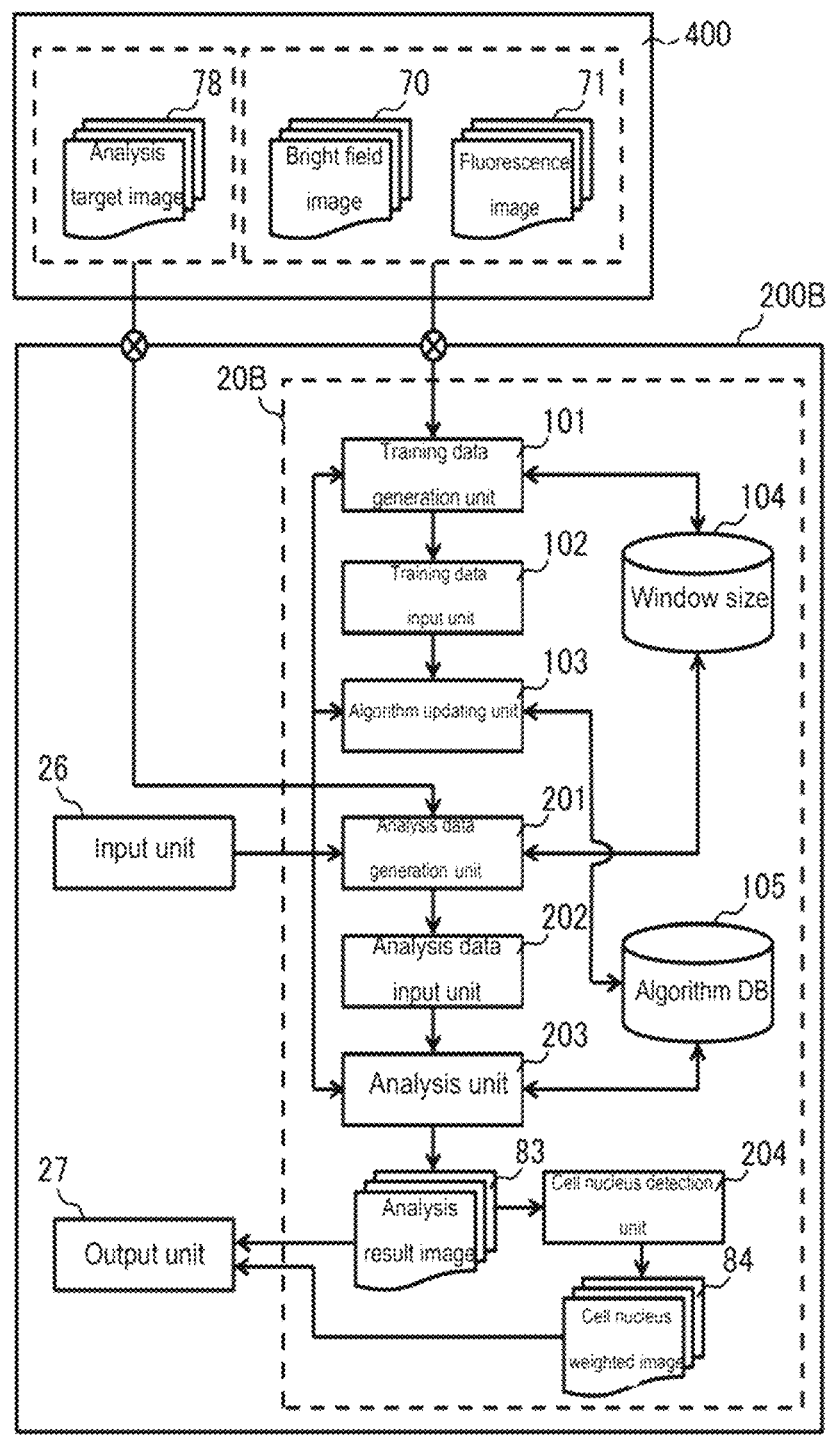
FIG. 13 is a block diagram illustrating functions of the integrated type image analysis apparatus 200B according to the second embodiment.

Referring to FIG. 13, the processing unit 20B of the image analysis apparatus 200B according to the second embodiment includes a training data generation unit 101, a training data input unit 102, an algorithm update unit 103, an analysis data generation unit 201, an analysis data input unit 202, an analysis unit 203, and a cell nucleus region detection unit 204. These functional blocks are realized by installing a program that causes a computer to execute a deep learning process and an image analysis process in the recording unit 23 or the memory 22 of the processing unit 20B and executing this program by the CPU 21. The window size database 104 and the algorithm database 105 are recorded in the recording unit 23 or the memory 22 of the processing unit 20B, and both are used jointly during deep learning and image analysis processing. The learned neural network 60 is stored beforehand in the algorithm database 105 in association with the type of tissue or the type of sample including cells, the coupling weight w is updated by the deep learning process, and stored as the deep learning algorithm 60 in the algorithm database 105. It should be noted that the first training image 70 and the second training image 71 which are the first training images for learning are captured in advance by the imaging apparatus 400 and stored in advance in the recording unit 23 or the memory 22 of the processing unit 20B. The analysis target image 78 of the analysis target sample is also imaged in advance by the imaging apparatus 400 and recorded in the recording unit 23 or the memory 22 of the processing unit 20B in advance.

The processing unit 20B of the image analysis apparatus 200B performs the processing shown in FIG. 11 at the time of the deep learning process and the processing shown in FIG. 8 at the time of the image analysis process. When describing each function block shown in FIG. 13, the processes of steps S11 to S13, S18 and S19 are performed by the training data generating unit 101 during the deep learning process. The process of step S14 is performed by the training data input unit 102. The processes of steps S15 to S17 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the cell nucleus region detection unit 204.

The procedure of the deep learning process and the procedure of the image analysis process performed by the image analysis apparatus 200B according to the second embodiment are similar to the procedures performed by the deep learning apparatus 100A and the image analysis apparatus 200A according to the first embodiment. Note that the image analysis apparatus 200B according to the second embodiment differs from the deep learning apparatus 100A and the image analysis apparatus 200A according to the first embodiment in the following points.

In step S13 at the time of the deep learning process, the processing unit 20B receives an input of the type of tissue for learning from the user of the image analysis apparatus 200B via the input unit 26. The processing unit 20B sets the window size by referring to the window size database 104 based on the type of the input tissue, and refers to the algorithm database 105 to set the neural network 50 used for learning.

As described above, the user of the image analysis apparatus 200B can acquire the binary image 83 as the analysis result by inputting the analysis target image 78 to the image analysis apparatus 200B. The user of the image analysis apparatus 200B also can acquire the cell nucleus region weighted image 84 as the analysis result.

According to the image analyzing apparatus 200 B according to the second embodiment, the user can use the type of tissue selected by the user as a tissue for learning. This means that the learning of the neural network 50 is not left to the vendor side, and the user himself can improve the degree of learning of the neural network 50.

Third Embodiment

Hereinafter, the image analysis system according to a third embodiment will be described with respect to points different from the image analysis system according to the second embodiment.

Structure Summary

Figure 14:
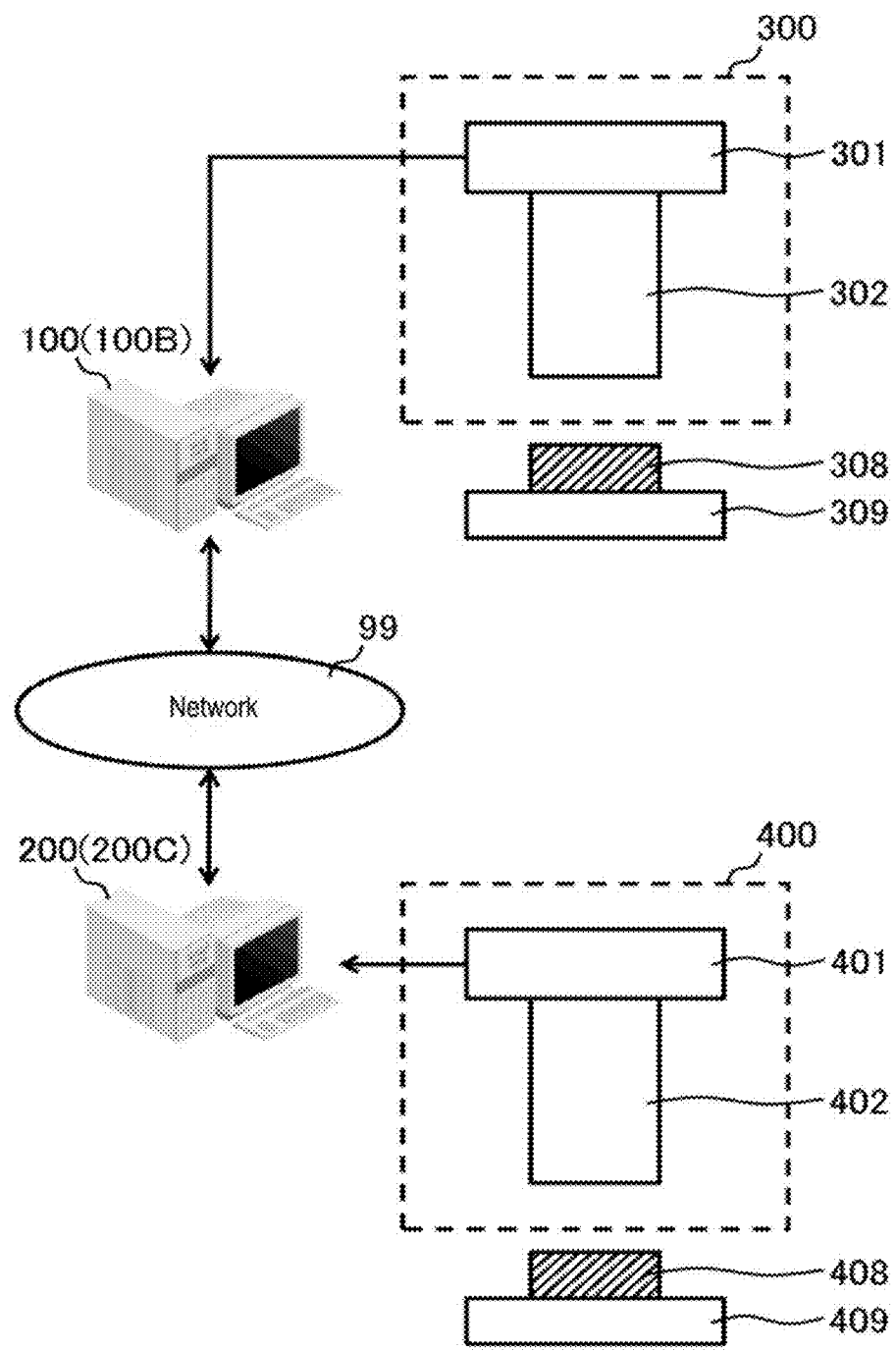
FIG. 14 is a schematic configuration diagram of an image analysis system according to a third embodiment.

Referring to FIG. 14, the image analysis system according to the third embodiment includes a vendor side apparatus 100 and a user side apparatus 200. The vendor side apparatus 100 operates as an integrated type image analysis apparatus 100B and the user side apparatus 200 operates as the terminal apparatus 200C. The image analysis apparatus 100B is, for example, a general-purpose computer and is a device on the cloud server side that performs both of the deep layer learning process and the image analysis process described in the first embodiment. The terminal apparatus 200C is composed of, for example, a general-purpose computer, and is a user side terminal apparatus that transmits an analysis target image to the image analysis apparatus 100B via the network 99, and receives an image of the analysis result from the image analysis apparatus 100B via the network 99.

The image analysis system according to the third embodiment is similar to the image analysis system according to the second embodiment in that the integrated image analysis apparatus 100B installed on the vendor side has the functions of both the deep learning apparatus 100A and the image analysis apparatus 200A according to the first embodiment. On the other hand, the image analysis system according to the third embodiment differs from the image analysis system according to the second embodiment in that it is provided a terminal apparatus 200C and supplies the input interface of the analysis target image and the output interface of the analysis result image to the terminal apparatus 200C on the user side. That is, the image analysis system according to the third embodiment is a client service type system in which the vendor side performs a deep learning process and an image analysis process and provides a cloud service type of input/output interface for analysis target images and analysis result images to the user side.

The image analysis apparatus 100B is connected to the imaging apparatus 300 and acquires the first training image 70 and the second training image 71 of the learning tissue captured by the imaging apparatus 300.

The terminal apparatus 200C is connected to the imaging apparatus 400, and acquires the analysis target image 78 of the analysis target tissue which is imaged by the imaging apparatus 400.

Hardware Structure

The hardware configuration of the image analysis apparatus 100B is similar to the hardware configuration of the vendor-side apparatus 100 shown in FIG. 5. The hardware configuration of the terminal apparatus 200C is the same as the hardware configuration of the user apparatus 200 shown in FIG. 6.

Function Block and Processing Procedure

Figure 15:
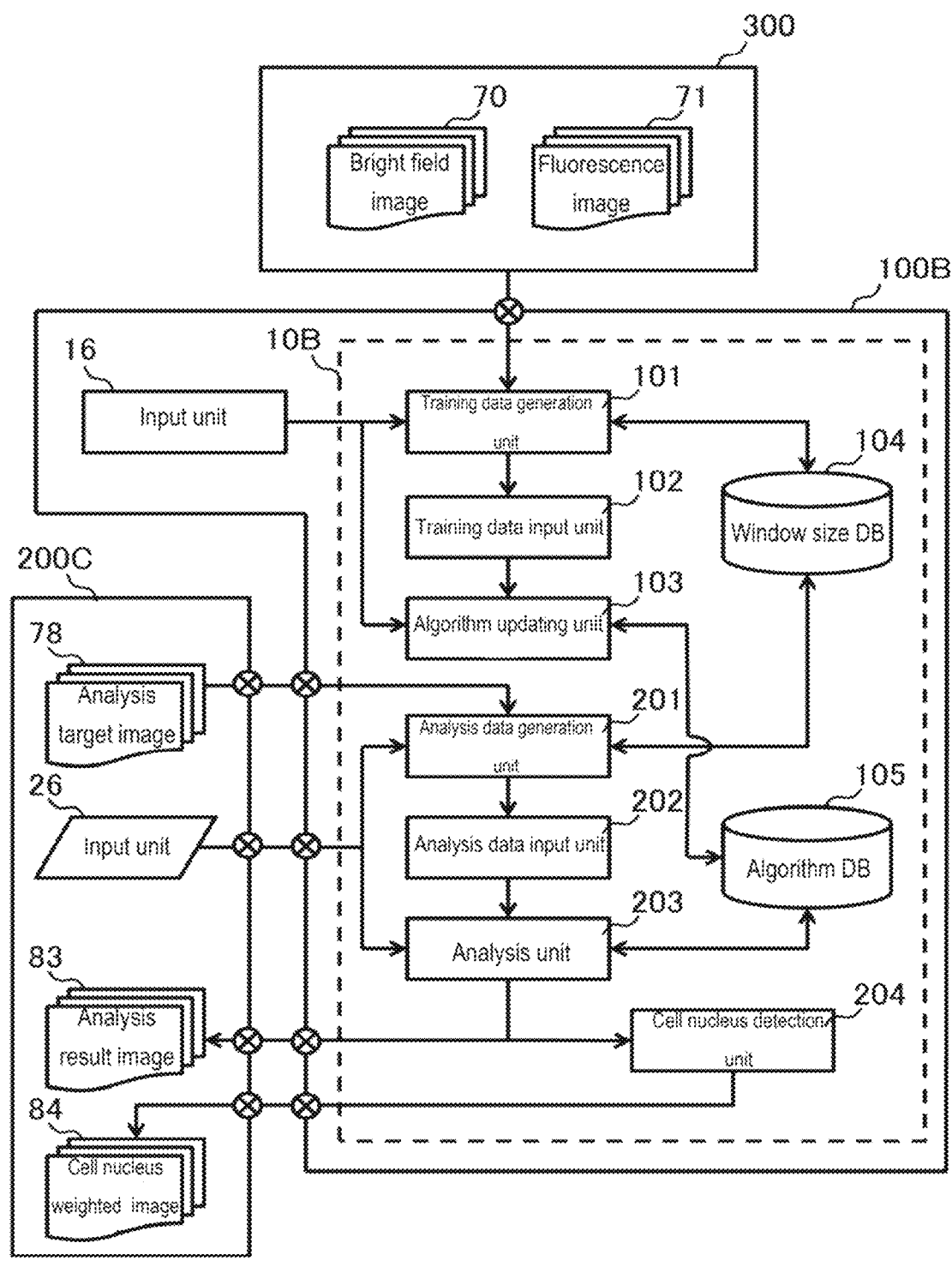
FIG. 15 is a block diagram illustrating functions of the integrated type image analysis apparatus 100B according to the third embodiment.

Referring to FIG. 15, the processing unit 20B of the image analysis apparatus 200B according to the third embodiment includes a training data generation unit 101, a training data input unit 102, an algorithm update unit 103, an analysis data generation unit 201, an analysis data input unit 202, an analysis unit 203, and a cell nucleus region detection unit 204. These functional blocks are realized by installing a program that causes a computer to execute a deep learning process and an image analysis process in the recording unit 13 or the memory 22 of the processing unit 10B and executing this program by the CPU 11. The window size database 104 and the algorithm database 105 are recorded in the recording unit 13 or the memory 12 of the processing unit 10B, and both are used jointly during deep learning and image analysis processing. The learned neural network 50 is stored beforehand in the algorithm database 105 in association with the type of tissue, the coupling weight w is updated by the deep learning process, and stored as the deep learning algorithm 60 in algorithm data base 105.

The first training image 70 and the second training image 71 of the sample for learning are captured in advance by the imaging device 300 and stored in advance in the recording unit 13 or the memory 12 of the processing unit 10B. The analysis target image 78 of the analysis target tissue is also imaged in advance by the imaging apparatus 400 and recorded in the recording unit 23 or the memory 22 of the processing unit 20C of the terminal apparatus 200C in advance.

The processing unit 10B of the image analysis apparatus 100B performs the process shown in FIG. 8 at the time of the deep learning process and the processing shown in FIG. 11 at the time of the image analysis process. When describing each function block shown in FIG. 15, the processes of steps S11 to S13, S18 and S19 are performed by the training data generating unit 101 during the deep learning process. The process of step S14 is performed by the training data input unit 102. The processes of steps S15 to S17 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the cell nucleus region detection unit 204.

The procedure of the deep learning process and the procedure of the image analysis process performed by the image analysis apparatus 100B according to the third embodiment are similar to the procedures performed by the deep learning apparatus 100A and the image analysis apparatus 200A according to the first embodiment. Note that the image analysis apparatus 100B according to the third embodiment differs from the deep learning apparatus 100A and the image analysis apparatus 200A according to the first embodiment in the following points.

The processing unit 10B receives the analysis target image 78 of the analysis target tissue from the terminal apparatus 200C on the user side, and generates color density encoded diagrams 79r, 79g, and 79b of R, G, and B colors from the received analysis target image 78 in step S21 during the image analysis process shown in FIG. 11. The generation method of the color density encoded diagrams 79r, 79g, and 79b is the same as the generation method of step S11 at the time of the deep learning process shown in FIG. 8.

In step S22 at the time of the image analysis process shown in FIG. 11, the processing unit 10B receives the input of the tissue type from the user of the terminal apparatus 200C as the analysis condition through the input unit 26 of the terminal apparatus 200C. The processing unit 10B refers to the window size database 104 and the algorithm database 105 on the basis of the entered tissue type to set the window size used for analysis, and acquires the deep learning algorithm 60 used for analysis.

In step S28 during the image analysis process, the processing unit 10B transmits the binary image 83 of the analysis result to the terminal apparatus 200C on the user side. In the terminal apparatus 200C on the user side, the processing unit 20C outputs the binary image 83 of the received analysis result to the output unit 27.

In step S29 during the image analysis process, the processing unit 10B also performs a detection process of the region of the cell nucleus on the binary image 83 of the analysis result following step S28. The processing unit 10B creates a cell nucleus area weighted image 84 by superimposing the obtained cell nucleus region on the analysis target image 78 of the analysis target. The processing unit 10B transmits the created cell nucleus region weighted image 84 to the user terminal apparatus 200C. In the terminal device 200C on the user side, the processing unit 20C outputs the received cell nucleus region weighted image 84 to the output unit 27, and ends the image analysis process.

As described above, the user of the terminal apparatus 200C can acquire the binary image 83 as the analysis result by transmitting the analysis target image 78 of the analysis target tissue to the image analysis apparatus 100B. The user of the terminal apparatus 200C also can acquire the cell nucleus region weighted image 84 as the analysis result.

According to the image analysis apparatus 100 B of the third embodiment, the user can be given the result of the image analysis process without acquiring the window size database 104 and the algorithm database 105 from the depth learning apparatus 100A. In this way it is possible to provide a service for analyzing the analysis target tissue and a service for discriminating the region of the cell nucleus as a cloud service.

The number of pathologists performing cytodiagnosis is insufficient nationwide. Pathologists are enrolled in a major hospital in urban areas, but most are not in remote medical institutions or in relatively small medical institutions such as clinics even in urban areas. The cloud service provided by the image analysis apparatus 100B and the terminal apparatus 200C aids tissue diagnosis and cytological diagnosis in such remote places or relatively small medical institutions.

Other Aspects

Although the present invention has been described in accordance with the summary and specific embodiments, the present invention is not limited to the above-described summary and specified embodiments.

Although the case of a gastric cancer has been described as an example in the first to third embodiments described above, the sample to be treated is not limited thereto, and a sample of the above-described tissue sample or a sample containing cells can be used.

Although the processing units 10A, 20B, and 10B refer to the window size database 104 to set the number of pixels of the window size in step S13 in the first to third embodiments, the pixel number of the window size also may be directly set by the operator or the user. In this case, the window size database 104 is unnecessary.

Although the processing units 10A, 20B, and 10B set the number of pixels of the window size based on the type of the input organization in step S13 in the first to third embodiments, the size of the tissue also may be input instead of inputting the type of tissue. The processing units 10A, 20B, and 10B may set the number of pixels of the window size by referring to the window size database 104 based on the size of the input tissue. In step S22, as in step S13, the size of the tissue may be input instead of entering the type of tissue. The processing units 20A, 20B, and 10B may refer to the window size database 104 and the algorithm database 105 to set the number of pixels of the window size and acquire the neural network 60 based on the size of the input tissue.

Regarding the mode of entering the size of the tissue, the size may be directly input as a numerical value, or a user may input a predetermined numerical range corresponding to the size to be selected and input by the user, for example, using the input user interface as a pull-down menu.

In steps S13 and S22, in addition to the type of the tissue or the size of the tissue, the imaging magnification at the time of capturing the first training image 70, the analysis target image 78, and the second training image 71 also may be input. Regarding the mode of inputting the imaging magnification, the magnification may be directly input as a numerical value, or a user may select a predetermined numerical range corresponding to the magnification that the user intends to input, for example, using the input user interface as a pull-down menu.

Although the window size is set to 3×3 pixels for the sake of convenience in the deep learning process and the image analysis process in the first to third embodiments, the number of pixels of the window size is not limited to this. The window size also may be set according to, for example, the type of the tissue sample and the type of the sample including cells. In this case, it suffices that the product of the number of pixels of the window size and the number of primary colors included in the image corresponds to the number of nodes of the input layers 50a and 60a of the neural networks 50 and 60.

In step S13, the processing units 10A, 20B, and 10B also may acquire the number of pixels of the window size and correct the number of pixels of the acquired window size based on the input imaging magnification.

In step S17, the processing units 10A, 20B, and OB record the deep layer learning algorithm 60 in the algorithm database 105 in association with the organization type on a one-to-one basis in the first to third embodiments. Alternatively, in step S17, the processing units 10A, 20B, 10B also may associate a plurality of tissue types with one deep learning algorithm 60 and record them in the algorithm database 105.

In the first to third embodiments the hue is defined by a combination of three primary colors of light or a combination of three primary colors of light, but the number of hues is not limited to three. The number of hues also may be four primary colors plus yellow (Y) to red (R), green (G), and blue (B), or three primary colors of red (R), green (G), and blue (B) It may be a two primary color in which any one hue is reduced as two primary colors. Alternatively, one primary color of only one of the three primary colors of red (R), green (G), and blue (B) (for example, green (G)) may be used. For example, the bright field images 70 and the analysis target image 78 acquired using a known microscope, a virtual slide scanner or the like are not limited to color images of three primary colors of red (R), green (G), and blue (B), and may be a color image of two primary colors or an image containing one or more primary colors.

Although the processing units 10A, 20B, and 10B generate the color density encoded diagrams 72r, 72g, and 72b as single color images of three primary colors in step S11 in the first to third embodiments, the gradation of the primary colors of the color density encoded diagrams 72r, 72g, and 72b is not limited to 3 gradations. The gradation of the color density encoded diagrams 72r, 72g, and 72b may be an image of two gradations or may be an image of one gradation or more. Similarly, although the processing units 20A, 20B, and 10B generate single-color images for each primary color of the color density encoded diagrams 79r, 79g, and 79b in step S21, the gradation of the primary color is not limited to 3 gradations when generating the color density encoded diagram. The primary color when creating the color density encoded diagram may be an image of two gradations or may be an image of one or more gradations. Illustratively, the gradation of the color density encoded diagrams 72r, 72g, 72b, 79r, 79g, 79b can be set to 256 levels (8 gradations) with color density values from value 0 to value 255.

Although the processing units 10A, 20B, and 10B generate R, G, B color density encoded graphics 72r, 72g, and 72b from the input first training image 70 in step S11 in the first to third embodiments, the input first training image 70 may be gradated in advance. That is, the processing units 10A, 20B, and 10B may directly obtain the color density encoded diagrams 72r, 72g, 72b of R, G, B colors from, for example, a virtual slide scanner or the like. Similarly, although the processing units 20A, 20B, and 10B generate the color density encoded diagrams 79r, 79g, and 79b of the respective colors of R, G, and B from the input analysis target image 78 in step S21, the input analysis target image 78 also may be gradated in advance. That is, the processing units 20A, 20B, and 10B may directly obtain the color density encoded diagrams 79r, 79g, and 79b of R, G, B colors from, for example, a virtual slide scanner or the like.

In the first to third embodiments described above, RGB is used for the color space when generating the color density encoded diagrams 72 and 79 from the first training images 70 and 78 of color, however, the color space is not limited to RGB. In addition to RGB, various color spaces can be used such as YUV, CMY, and CIE L*a*b*.

In the first to third embodiments, density values of each pixel are stored in the order of red (R), green (G), and blue (B) in the training data 74 and the analysis data 80, however, the order of storing and handling density values is not limited to this. For example, the density values may be stored in the order of blue (B), green (G), and red (R), and the order of arrangement of density values in the training data 74 and the order of arrangement of density values in the analysis data 80 may be the same.

Although the processing units 10 A, 20 B, and 10 B binarize the gradation of each pixel of the input second training image 71 to generate the true value image 73 in step S12 of the first to third embodiments, it is also possible to acquire the binarized true value image 73 in advance.

Although the processing units 10A and 10B are realized as an integrated device in the first to third embodiments, the processing units 10A and 10B need not be integrated devices, and may be any of a CPU 11, a memory 12, a recording unit 13 and the like arranged in different locations and connected via a network. The processing units 10A and 10B, the input unit 16, and the output unit 17 are not necessarily arranged in one place, and they may be arranged separately from each other and connected to each other so as to communicate with each other via a network. The processing units 20A, 20B, 20C are also the same as the processing units 10A, 10B.

Although each function block of the training data generation unit 101, the training data input unit 102, the algorithm update unit 103, the analysis data generation unit 201, the analysis data input unit 202, the analysis unit 203, and the cell nucleus region detection unit 204 is executed by a single CPU 11 or a single CPU 21 in the first to third embodiments, these function blocks are not necessary executed on a single CPU, and also may be distributedly executed among a plurality of CPUs. Each of these functional blocks also may be distributedly executed by a plurality of GPUs, or may be distributedly executed by a plurality of CPUs and a plurality of GPUs.

In the second and third embodiments described above, programs for performing the process of each step described in FIGS. 8 and 11 are recorded in the recording units 13 and 23 in advance. Alternatively, the program may be installed in the processing units 10B and 20B from a computer readable non-transitory tangible recording medium 98 such as a DVD-ROM or a USB memory. Alternatively, the processors 10B and 20B may be connected to the network 99, and the program may be downloaded and installed from, for example, an external server (not shown) via the network 99.

In the first to third embodiments, the input units 16 and 26 are input devices such as a keyboard or a mouse, and the output units 17 and 27 are realized as a display device such as a liquid crystal display. Alternatively, the input units 16 and 26 and the output units 17 and 27 may be integrated and realized as a touch panel type display device. Alternatively, the output units 17 and 27 may be composed of a printer or the like, and the binary image 83 of the analysis result or the cell nucleus region weighted image 84 of the cell nucleus may be printed and output.

Although the imaging device 300 is directly connected to the depth learning device 100A or the image analysis device 100B in the first to third embodiments, the imaging apparatus 300 also may be connected via the network 99 to the deep learning apparatus 100A, or may be connected to the image analyzing apparatus 100B. Similarly, although the imaging apparatus 400 is directly connected to the image analysis apparatus 200A or image analysis apparatus 200B, the imaging apparatus 400 also may be connected to the image analysis apparatus 200A or the image analysis apparatus 200B via the network 99.

EXAMPLE

Examples of the present invention will be shown below, and features of the present invention will be clarified.

Example 1

A deep learning process and image analysis process were performed in the stand-alone type system shown in the second embodiment. The tissues to be learned and analyzed were gastric cancer tissues. Analysis was performed on two different gastric cancer tissue samples.

Creation of Training Data and Learning

Figure 16A:
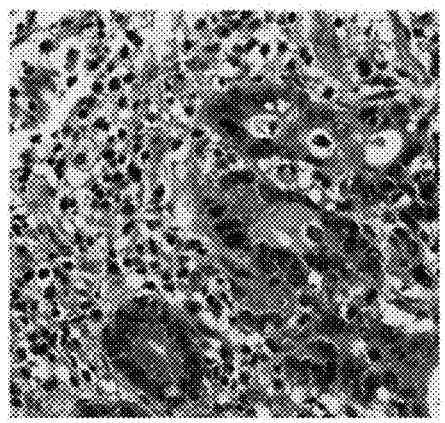
FIGS. 16A-16C are binarized images created from a bright field image, a fluorescence image, and a fluorescence image used for generating training data in Example 1.
Figure 16B:
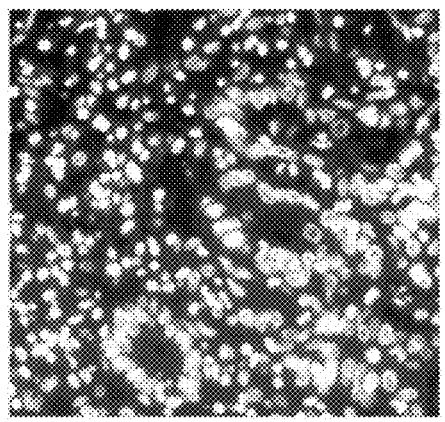
Figure 16C:
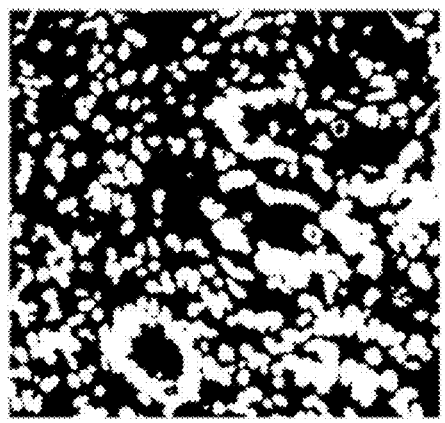

Whole slide images (WSI) of bright field images of stomach cancer tissue stained with HE and fluorescent images of stomach cancer tissues stained with DAPI were color imaged using a virtual slide scanner. The imaging magnification was 40 times. Thereafter, the color density values of each of the R, G, B colors were gradated based on the bright field image, and color density encoding diagrams of each color of R, G, B were prepared. Based on the DAPI stained fluorescence image, a binary image was created by binarizing the color density values of the region of the cell nucleus and the other region using a preset threshold value. FIGS. 16A and 16B show the bright-field image and the fluorescence image obtained by imaging, respectively, and the binarized image created from the fluorescence image is shown in FIG. 16C.

After that, training data were prepared by combining the color density encoded diagram and the binarized image. The created training data were divided into a window size of 113×113 pixels and the neural network learned the divided training data of the window size as the input layer. For example, the 113×113 pixels adopted as the window size is a size that supports including in the window the entire shape of the cell nucleus region of at least one cell among the plural cells of about two to nine cells.

Analysis Target Image Preparation

Similarly to the training data, a whole slide image of a bright field image of HE-stained gastric cancer tissue was color-imaged using a virtual slide scanner. The imaging magnification was 40 times. Thereafter, color density encoded diagrams of each color of R, G, and B were created based on the captured bright field image, and an analysis target image was created by combining the color density encoded diagrams of each of the created R, G, B colors.

Analysis Result

Analysis data with a window size of 113×113 pixels were created around each pixel of the analysis target image and analysis data for the created window size were input to the learned neural network. Based on the analysis results output from the neural network, the analysis data were classified into a cell nucleus region and other region, and the contour of the cell nucleus region is surrounded by white. The analysis results are shown in FIGS. 17A-17B and 18A-18B.

Figure 17A:
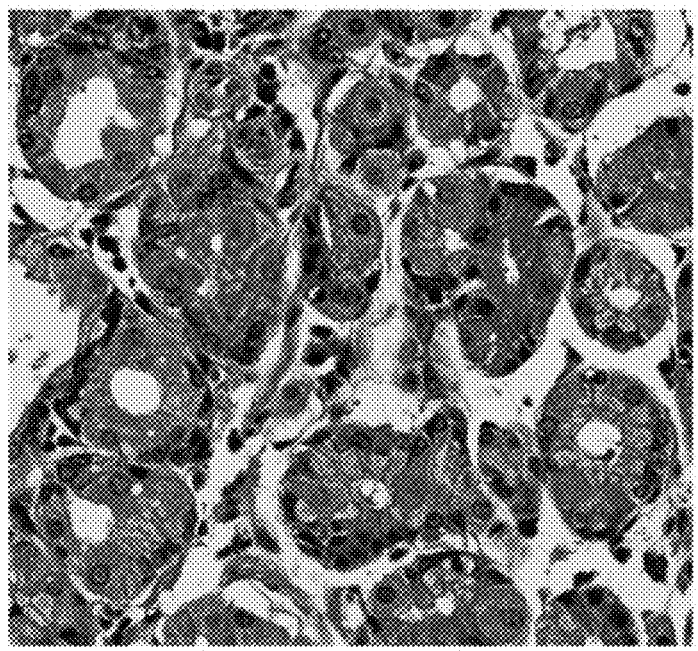
FIGS. 17A-17B are results of analyzing an image of a sample (HE stain) of a first gastric cancer tissue in Example 1.
Figure 17B:
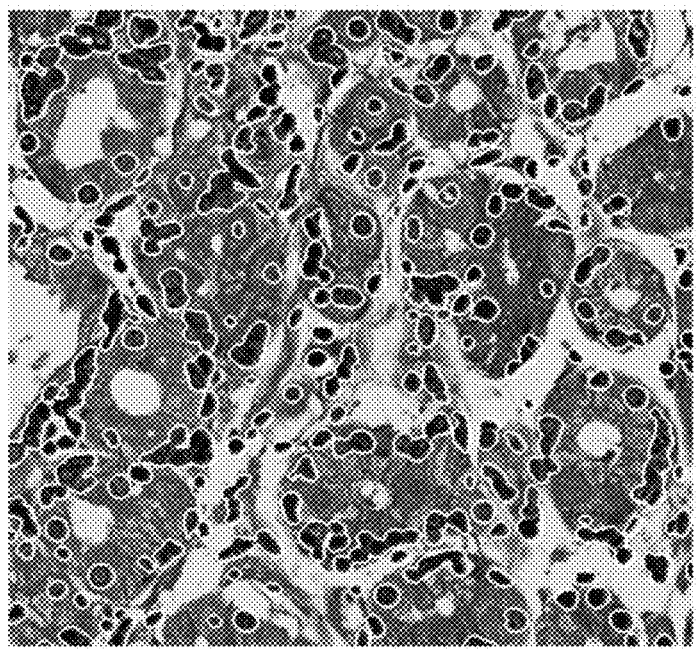

FIGS. 17A-17B show the analysis result of the first stomach cancer tissue sample image. FIG. 17A is a bright field image obtained by staining the stomach cancer tissue with HE and FIG. 17B is an image showing a contour of the region of the cell nucleus obtained by the analysis processing displayed superimposed on the image of FIG. 17A. In FIG. 17B, the region surrounded by white is the region of cell nucleus.

Figure 18A:
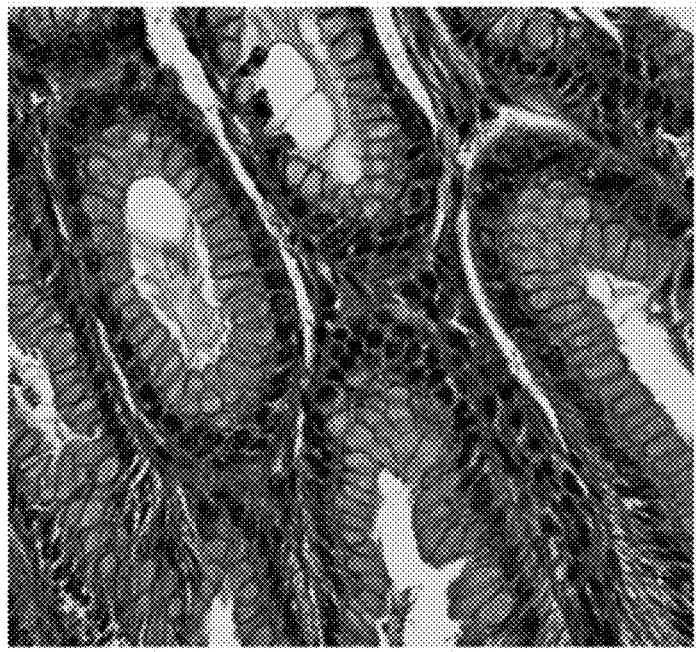
FIGS. 18A-18B are results of analyzing an image of a sample (HE stain) of a second gastric cancer tissue in Example 1.
Figure 18B:
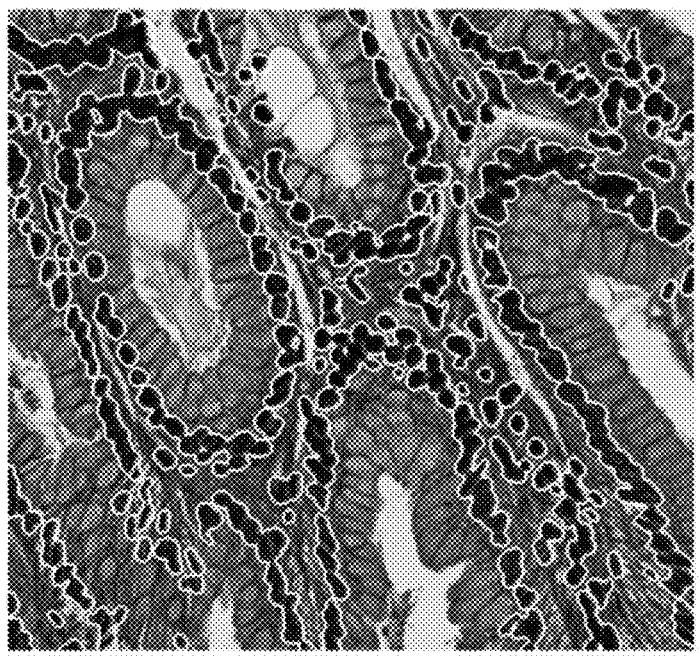

FIGS. 18A-18B show the analysis result of the second gastric cancer tissue sample image. FIG. 18A is a bright field image obtained by staining the gastric cancer tissue with HE, and FIG. 18B is an image showing a contour of the region of the cell nucleus obtained by the analysis processing displayed superimposed on the image of FIG. 18A. In FIG. 18B, the region surrounded by white is the region of cell nucleus.

As shown in FIGS. 17A-17B and 18A-18B, it was possible to determine whether a region is a cell nucleus region at an arbitrary position of two different types of pathological tissue images. The correct interpretation rate of region determination of the cell nucleus was 85% or better.

Example 2

Cells imprinted with gastric tissue were subjected to Papanicolaou staining and samples were prepared. With respect to this sample, the same analysis processing as that in the first embodiment was performed using the learned neural network. Cell imprinting was conducted on the gastric cancer site and the non-gastric cancer site. The analysis results are shown in FIGS. 19A-19B and 20A-20B.

Figure 19A:
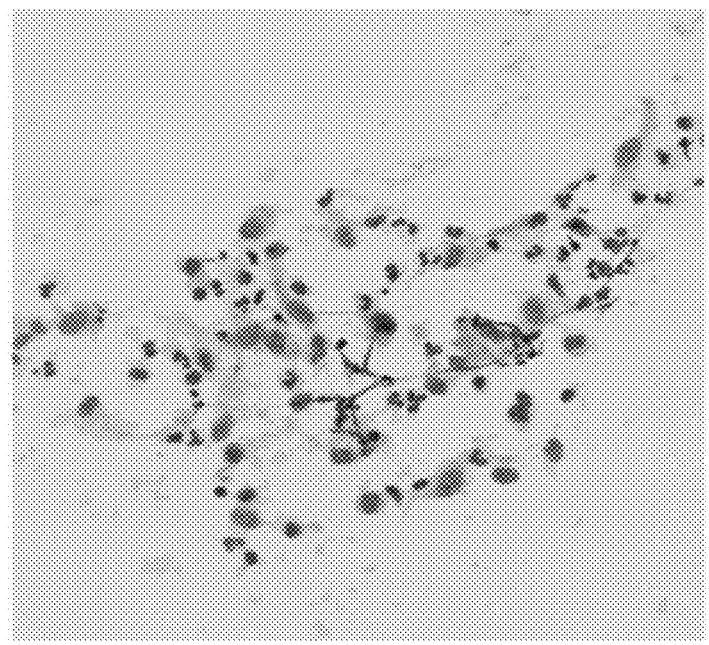
FIGS. 19A-19B are results of analysis of an image of sealed samples (Papanicolaou stain) of gastric cancer site in Example 2.
Figure 19B:
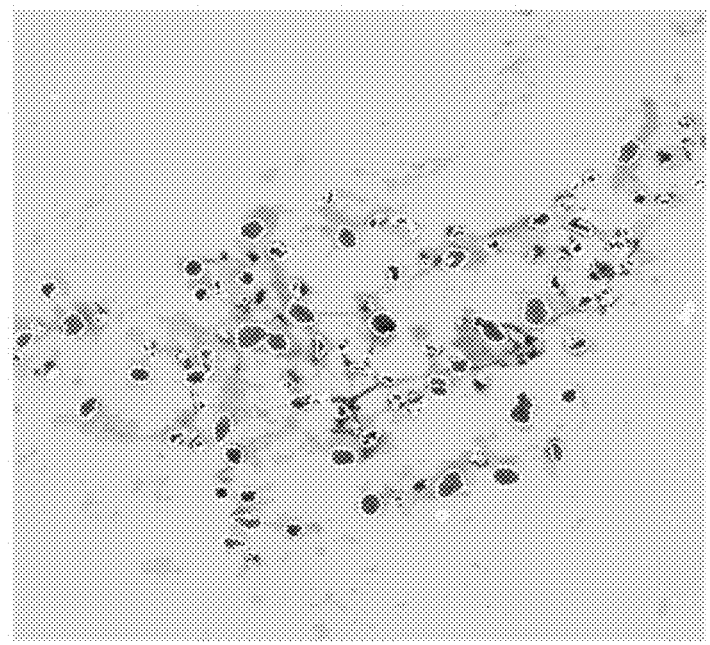

FIGS. 19A-19B show the analysis result of the touch imprint sample of the stomach cancer part. FIG. 19A is a bright field image obtained by staining the gastric cancer tissue with HE, and FIG. 19B is an image showing a contour of the region of the cell nucleus obtained by the analysis process displayed superimposed on the image of FIG. 19A. In FIG. 19B, the region surrounded by white is the region of cell nucleus.

Figure 20A:
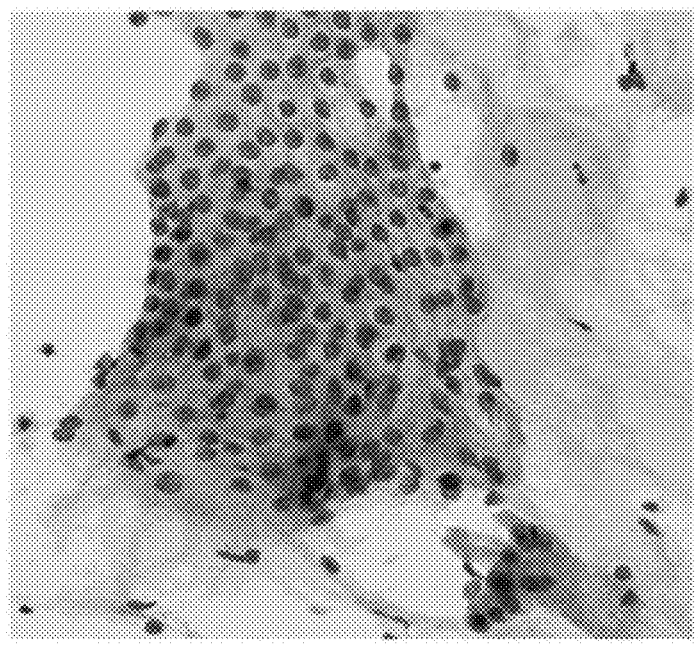
FIGS. 20A-20B are results of analyzing an image of sealed samples (Papanicolaou stain) of a non-gastric cancer site in Example 2.
Figure 20B:
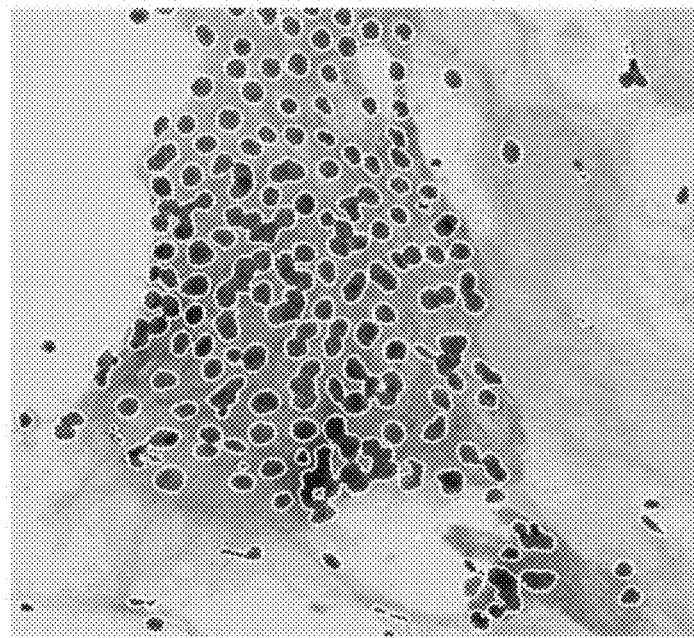

FIGS. 20A-20B show the analysis result of the touch imprint sample of the gastric cancer site. FIG. 20A is a bright field image obtained by staining the gastric cancer tissue with HE, and FIG. 20B is an image showing a contour of the region of the cell nucleus obtained by the analysis process displayed superimposed on the image of FIG. 20A. In FIG. 20B, the region surrounded by white is the region of cell nucleus.

As shown in FIGS. 19A-19B and FIGS. 20A-20B, it was possible to determine whether a region is a cell nucleus region at an arbitrary position of a touch imprinted sample which is different than the staining mode from the above-mentioned Example 1.

What is claimed is:

1. An image analysis method for analyzing an image of a tissue or a cell to be analyzed using a deep learning algorithm of a neural network structure, the method comprising:
generating analysis data from an analysis target image that include the tissue or the cell to be analyzed;
inputting the analysis data to the deep learning algorithm, and
generating data indicating a region of a cell nucleus in the analysis target image by the deep learning algorithm,
wherein training data used for learning of the deep learning algorithm are generated based on a bright field image of a tissue specimen or a sample containing a cell captured under a bright field microscope and a fluorescence image of a cell nucleus in the same tissue specimen or the same sample prepared by applying fluorescent nuclear stain to the same tissue specimen or the same sample for fluorescence observation by a fluorescence microscope, wherein the fluorescence image is converted to binary data indicating which part of the fluorescence image is the cell nucleus region, and the analysis target image is a bright field image.

2. The image analysis method according to claim 1, wherein
the analysis target image is an image of a tissue diagnostic sample, and the analysis target image includes a hue comprised of one primary color or a hue obtained by combining two or more primary colors.

3. The image analysis method according to claim 1, wherein
the analysis target image is an image of a cell diagnostic sample, and the analysis target image includes a hue comprised of one primary color or a hue obtained by combining two or more primary colors.

4. The image analysis method according to according to claim 1, wherein
the deep learning algorithm determines whether an arbitrary position in the analysis target image is a region of a cell nucleus.

5. The image analysis method according to claim 1, wherein
analysis data are generated for each region of the predetermined number of pixels including peripheral pixels circumscribing a predetermined pixel; and
the deep learning algorithm generates a label indicating whether the predetermined pixel is one of the region of the cell nucleus.

6. The image analysis method according to claim 1, wherein
a number of nodes of the input layer of the neural network corresponds to a product of the predetermined number of pixels of the analysis data and a number of combined primary colors.

7. The image analysis method according to claim 2, wherein
the tissue diagnostic sample is a stained sample, and the analysis target image is an image obtained by imaging the stained sample under a bright field microscope.

8. The image analysis method according to claim 2, wherein
the cell diagnostic sample is a stained sample, and the analysis target image is an image obtained by imaging the stained sample under a bright field microscope.

9. The image analysis method according to claim 7, wherein
a stain for bright-field observation comprises hematoxylin-eosin.

10. The image analysis method of claim 8, wherein a stain for bright field observation is Papanicolaou.

11. The image analysis method according to claim 1, wherein
the deep learning algorithm classifies the analysis data into classes indicating a region of a cell nucleus contained in the analysis target image.

12. The image analysis method according to claim 1, wherein
an output layer of the neural network comprises a node having a softmax function as an activation function.

13. The image analysis method according to claim 1, further comprising
outputting a cell nucleus region weighted image that the region of the cell nucleus is superimposed on the analysis target image.

14. An image analysis apparatus for analyzing an image of a tissue or a cell using a deep learning algorithm of a neural network structure, the apparatus comprising a system configured to:
generating analysis data from an analysis target image that include the tissue or the cell to be analyzed;
inputting the analysis data to the deep learning algorithm, and
generating data indicating a region of a cell nucleus in the analysis target image by the deep learning algorithm, wherein training data used for learning of the deep learning algorithm are generated based on a bright field image of a tissue specimen or a sample containing a cell captured under a bright field microscope and a fluorescence image of a cell nucleus in the same tissue specimen or the same sample prepared by applying fluorescent nuclear stain to the same tissue specimen or the same sample for fluorescence observation by a fluorescence microscope, wherein the fluorescence image is converted to binary data indicating which part of the fluorescence image is the cell nucleus region, and the analysis target image is a bright field image.

\* \* \* \* \*